US012580662B2

(12) United States Patent
O'Sullivan et al.

(10) Patent No.: US 12,580,662 B2
(45) Date of Patent: Mar. 17, 2026

(54) METHOD AND SYSTEM FOR MITIGATING ADVERSE EFFECTS OF A GAS ABSORPTION LINE IN COHERENT OPTICAL COMMUNICATION SYSTEMS

(71) Applicant: CIENA CORPORATION, Hanover, MD (US)

(72) Inventors: Maurice O'Sullivan, Ottawa (CA); Douglas Charlton, Kanata (CA); Mohammad Ebrahim Mousa Pasandi, Ottawa (CA); Charles Laperle, Richmond (CA); Kim Byron Roberts, Ottawa (CA); Michael Reimer, Sittsville (CA)

(73) Assignee: CIENA CORPORATION, Hanover, MD (US)

( * ) Notice: Subject to any disclaimer, the term of this patent is extended or adjusted under 35 U.S.C. 154(b) by 295 days.

(21) Appl. No.: 18/342,305

(22) Filed: Jun. 27, 2023

(65) Prior Publication Data

US 2025/0007617 A1    Jan. 2, 2025

(51) Int. Cl.
*H04B 10/61* (2013.01)
*H04Q 11/00* (2006.01)

(52) U.S. Cl.
CPC ..... *H04B 10/6161* (2013.01); *H04Q 11/0062* (2013.01); *H04Q 2011/0081* (2013.01)

(58) Field of Classification Search
CPC .................................................. H04B 10/616
See application file for complete search history.

(56) References Cited

U.S. PATENT DOCUMENTS

| | | | |
|---|---|---|---|
| 6,687,464 B1 | 2/2004 | Roberts et al. |
| 7,221,820 B2 | 5/2007 | Boertjes et al. |
| 7,376,358 B2 | 5/2008 | Roberts et al. |
| 7,555,227 B2 | 6/2009 | Bontu et al. |
| 7,606,498 B1 | 10/2009 | Wu et al. |
| 7,627,252 B2 | 12/2009 | Sun et al. |
| 7,636,525 B1 | 12/2009 | Bontu et al. |
| 7,894,728 B1 | 2/2011 | Sun et al. |
| 8,005,368 B2 | 8/2011 | Roberts et al. |

(Continued)

OTHER PUBLICATIONS

Zhang et al., "100 Gbit/s WDM transmission at 2 μm: transmission studies in both low-loss hollow core photonic bandgap fiber and solid core fiber", Optics Express, vol. 23, No. 4, Feb. 2015 (Year: 2015).*

(Continued)

*Primary Examiner* — Shi K Li
(74) *Attorney, Agent, or Firm* — Guntin & Gust, PLC; Mark Wilinski

(57)         ABSTRACT

Aspects of the subject disclosure may include, for example, a device including a detector configured to identify a narrow-band absorption occurring within a signal spectrum of an optical signal propagating through a gaseous medium, wherein the optical signal is configured to communicate digital information via an optical communication link including a transmitter, a receiver and an optical transport medium therebetween. The device further includes a mitigation controller configured to control a digital circuit to mitigate at least a portion of a vulnerability of the optical communication link, the vulnerability associated with the narrow-band absorption. Other embodiments are disclosed.

20 Claims, 23 Drawing Sheets

(56) References Cited

U.S. PATENT DOCUMENTS

| | | | |
|---|---|---|---|
| 8,385,747 | B2 | 2/2013 | Roberts et al. |
| 10,211,919 | B2 | 2/2019 | Oveis Gharan et al. |
| 10,608,746 | B2 | 3/2020 | Zhuge et al. |
| 11,038,599 | B1 | 6/2021 | Oveis Gharan et al. |
| 11,126,219 | B2 | 9/2021 | Oveis Gharan et al. |
| 11,233,568 | B1 | 1/2022 | Oveis Gharan et al. |
| 11,239,929 | B1 | 2/2022 | Babaee et al. |
| 2014/0169501 | A1* | 6/2014 | Nazarathy .......... H03H 21/0012 |
| | | | 375/316 |
| 2017/0117983 | A1* | 4/2017 | Al Sayeed ....... H04B 10/07955 |
| 2017/0353242 | A1* | 12/2017 | Mansouri Rad . H04B 10/25891 |
| 2018/0069631 | A1 | 3/2018 | Ashrafi |
| 2020/0342848 | A1* | 10/2020 | Daido ..................... G10L 13/02 |
| 2025/0016479 | A1* | 1/2025 | Kanai ................ H04Q 11/0005 |

OTHER PUBLICATIONS

Nazarathy et al., "Subbanded DSP Architectures Based on Underdecimated Filter Banks for Coherent OFDM Receivers", IEEE Signal processing magazine, 2014 (Year: 2014).*

"International Search Report and Written Opinion for PCT/US2024/035563", Oct. 24, 2024, 13 pages.

Poggiolini, Pierluigi, et al., "Ultra-Long-Haul WDM Transmission Using NANF Hollow-Core Fiber", 2022 27th OptoElectronics and Communications Conference (OECC) and 2022 International Conference on Photonics in Switching and Computing (PSC) tenutosi a Toyama, Japan, 2022, 5 pages.

Sakr, H., et al., "Interband Short Reach Data Transmission in Ultrawide Bandwidth Hollow Core Fiber", Journal of Lightwave Technology, IEEE, USA, vol. 38, No. 1, Jan. 1, 2020, 8 pages.

Xing, Ouyang, et al., "Experimental Demonstration of Improved Equalization Algorithm for IM/DD Fast OFDM", Photonics Technology Letters, IEEE, USA, vol. 27, No. 16, Aug. 15, 2015, pp. 1780-1783.

"800G WaveLogic 5 Extreme MOTR Module", Data Sheet, CIENA, 2022, 3 pages.

Krupenie, Paul H., "The Band Spectrum of Carbon Monoxide", United States Department of Commerce; National Standard Reference Data Series, The National Bureau of Standards—5, Jul. 11, 1966, 104 pages.

Yurchenko, S. N., et al., "ExoMol line lists—XXXIX. Ro-vibrational molecular line list for CO2", Compiled using MNRAS Latex style file v3.0, Jul. 10, 2020, 12 pages.

* cited by examiner

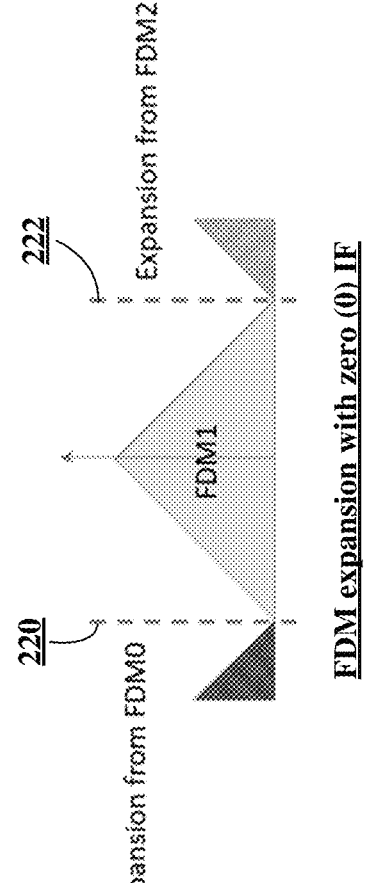
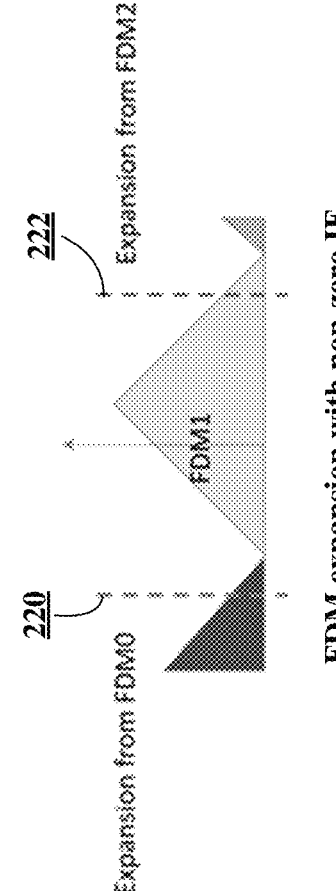
FIG. 2C

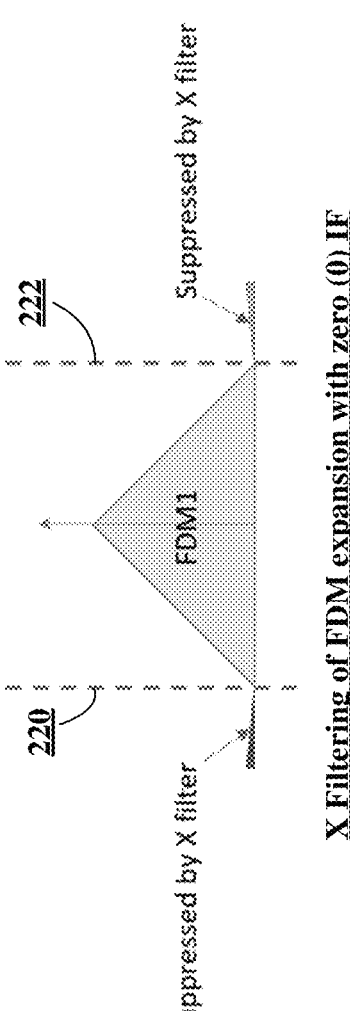
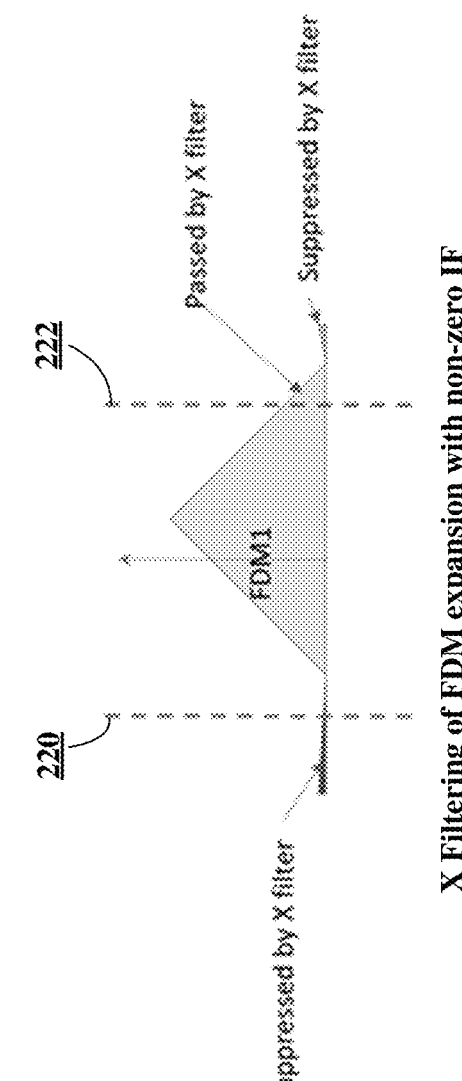
X Filtering of FDM expansion with zero (0) IF
X Filtering of FDM expansion with non-zero IF
FIG. 2D In the above example configuration, each FDM slice of the X filter may be implemented as follows:

Figure 3:
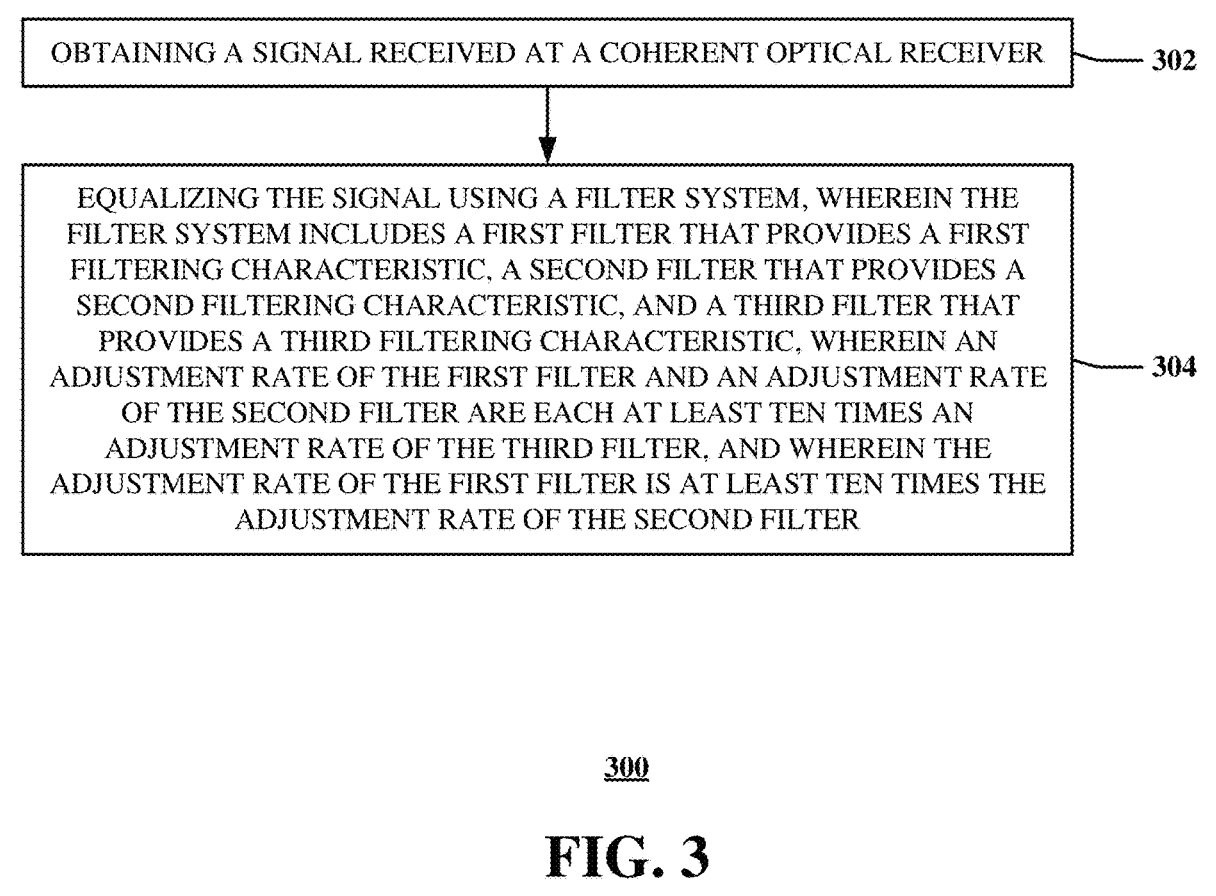

OBTAINING A SIGNAL RECEIVED AT A COHERENT OPTICAL RECEIVER — 302

EQUALIZING THE SIGNAL USING A FILTER SYSTEM, WHEREIN THE FILTER SYSTEM INCLUDES A FIRST FILTER THAT PROVIDES A FIRST FILTERING CHARACTERISTIC, A SECOND FILTER THAT PROVIDES A SECOND FILTERING CHARACTERISTIC, AND A THIRD FILTER THAT PROVIDES A THIRD FILTERING CHARACTERISTIC, WHEREIN AN ADJUSTMENT RATE OF THE FIRST FILTER AND AN ADJUSTMENT RATE OF THE SECOND FILTER ARE EACH AT LEAST TEN TIMES AN ADJUSTMENT RATE OF THE THIRD FILTER, AND WHEREIN THE ADJUSTMENT RATE OF THE FIRST FILTER IS AT LEAST TEN TIMES THE ADJUSTMENT RATE OF THE SECOND FILTER — 304

605 — IDENTIFY NARROW-BAND ABSORPTION OCCURRING IN A FREQUENCY SPECTRUM OF AN OPTICAL SIGNAL OF AN OPTICAL COMMUNICATION LINK TRAVERSING A GASEOUS MEDIUM

610 — ASSOCIATING THE NARROW-BAND ABSORPTION WITH A VULNERABILITY OF THE OPTICAL COMMUNICATION LINK

615 — CONTROLLING A DIGITAL CIRCUIT TO MITIGATE AT LEAST A PORTION OF THE VULNERABILITY

<u>600</u>

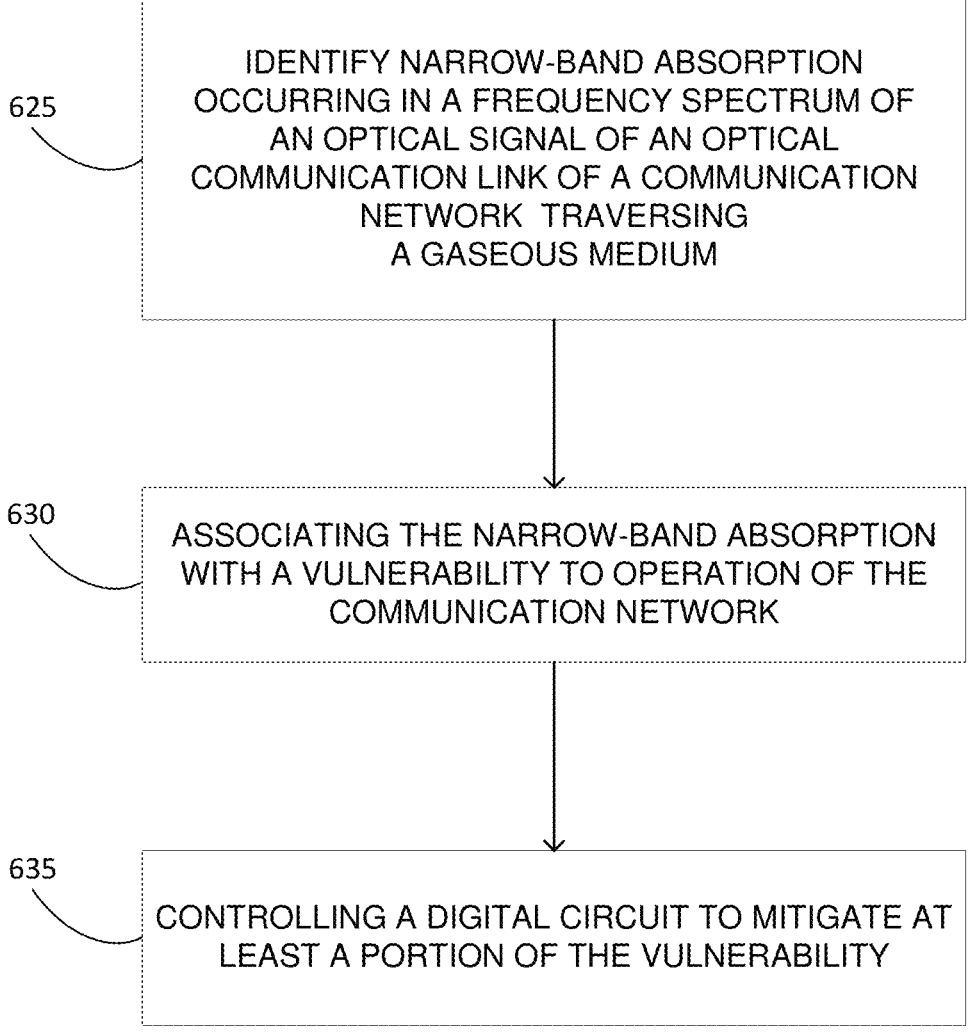

625 — IDENTIFY NARROW-BAND ABSORPTION OCCURRING IN A FREQUENCY SPECTRUM OF AN OPTICAL SIGNAL OF AN OPTICAL COMMUNICATION LINK OF A COMMUNICATION NETWORK  TRAVERSING A GASEOUS MEDIUM

630 — ASSOCIATING THE NARROW-BAND ABSORPTION WITH A VULNERABILITY TO OPERATION OF THE COMMUNICATION NETWORK

635 — CONTROLLING A DIGITAL CIRCUIT TO MITIGATE AT LEAST A PORTION OF THE VULNERABILITY

Spectrum of the received signal after installing the gas line notch signature in Tx C-filter baseband spectrum.

Clock RMS and CD estimates a function of the center of the gas line notch with respect to baseband spectrum.

1050

1000

1100

METHOD AND SYSTEM FOR MITIGATING ADVERSE EFFECTS OF A GAS ABSORPTION LINE IN COHERENT OPTICAL COMMUNICATION SYSTEMS

FIELD OF THE DISCLOSURE

The subject disclosure relates to a method and system for mitigating adverse effects of a gas absorption line in coherent optical communication systems.

BACKGROUND

In coherent optical communications, a receiver that receives an optical signal with modulated data may mix the signal with a strong, narrow-linewidth, local oscillator signal by way of an optical hybrid, where the combined signal may then be made incident on one or more photodetectors. In certain implementations, the received optical signal may first be split into orthogonal polarizations that are then processed by a respective optical hybrid. In-phase and quadrature components of each polarization may be detected using respective photodetectors that are positioned to receive corresponding signals output by the optical hybrid. In any case, the frequency spectrum of the electrical current outputs of the photodetector(s) is substantially proportional to the convolution of the received optical signal spectrum and the local oscillator spectrum and contains a signal component lying at an intermediate frequency (abbreviated IF or as an algebraic symbol $f_{IF}$) that "contains" the data. This data component can be isolated and detected by way of electronic filtering and processing of the photodetector outputs.

Hollow core fiber cable has recently been commercially deployed in a limited number of applications, such as high-speed trading (HST) applications. Beneficially, the hollow core fibers offer a substantial reduction in link latency, e.g., by about ⅓, over solid core fibers. Such improved performance is related, at least in part, to the introduction of a gaseous core. Hollow core fiber applications are typically short length and able to tolerate high fiber loss as well as high concentrations of contaminant gas. Recently hollow core fibers with losses approaching glass core have been manufactured. These are expected to be used in much longer reach applications for which trace amounts of gas contaminants can alter the stability of coherent transmission continuity.

BRIEF DESCRIPTION OF THE DRAWINGS

Reference will now be made to the accompanying drawings, which are not necessarily drawn to scale, and wherein:

FIG. 2C illustrates FDM expansion of neighboring FDMs in a case where IF is zero relative to a case where IF is non-zero, in accordance with various aspects described herein.

FIG. 2D illustrates X filtering of FDM expansions at edges of an FDM signal for zero IF and non-zero IF, in accordance with various aspects described herein.

FIG. 3 depicts an illustrative embodiment of a process in accordance with various aspects described herein.

FIGS. 6A, 6B and 6C depict illustrative embodiments of a gas absorption mitigation process in accordance with various aspects described herein.

DETAILED DESCRIPTION

Figure 1:
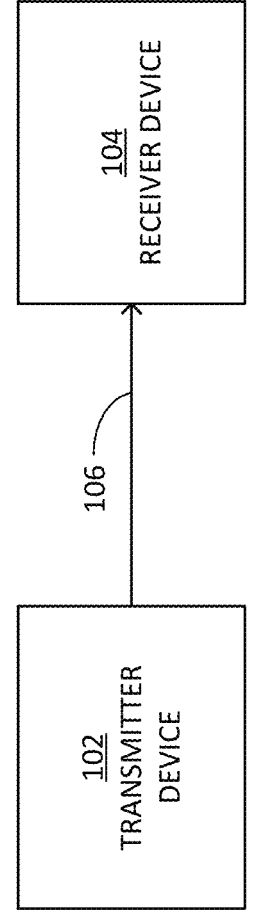
FIG. 1 is a diagram of a non-limiting example of a communication network in accordance with various aspects described herein.

The subject disclosure describes, among other things, illustrative embodiments for controlling a digital circuit of a coherent optical communication system to mitigate a vulnerability of the system to a narrow-band absorption resulting from a transport medium that incorporates a gaseous composition traversed by an optical signal of the coherent optical communication link. Other embodiments are described in the subject disclosure.

One or more aspects of the subject disclosure include a process of equalizing a signal. The process includes identifying a narrow-band absorption occurring within a signal spectrum of an optical signal propagating through a gaseous medium. The optical signal is configured to communicate digital information via an optical communication link, including a transmitter, a receiver and an optical transport medium therebetween. The process further includes associating the narrow-band absorption with a vulnerability of the optical communication link and controlling a digital circuit to mitigate at least a portion of the vulnerability.

One or more aspects of the subject disclosure include a device, that includes a detector configured to identify a narrow-band absorption occurring within a frequency spectrum of an optical signal propagating through a gaseous medium. The optical signal is configured to communicate digital information via an optical communication link comprising a transmitter, a receiver and an optical transport medium therebetween. The device further includes a mitigation controller configured to control a digital circuit to mitigate at least a portion of a vulnerability of the optical communication link, the vulnerability associated with the narrow-band absorption.

One or more aspects of the subject disclosure include a network controller, that includes a detector interface configured to receive detection of a narrow-band absorption occurring within a frequency spectrum of an optical signal propagating through a gaseous medium. The optical signal is configured to communicate digital information via an optical communication link of a number of optical communication links of a communication network, the optical communication link including a transmitter, a receiver and an optical transport medium therebetween. The device further includes a mitigation controller configured to control a digital circuit to mitigate at least a portion of a vulnerability of the optical communication link, the vulnerability associated with the detection of the narrow-band absorption.

One or more aspects of the subject disclosure include a non-transitory, machine-readable medium, including executable instructions that, when executed by a processing system including a processor, facilitate performance of operations. The operations include identifying a narrow-band absorption occurring within a frequency spectrum of an optical signal propagating through a gaseous medium. The optical signal is configured to communicate digital information via an optical communication link comprising a transmitter, a receiver and an optical transport medium therebetween. The operations further include controlling a digital circuit to mitigate at least a portion of a vulnerability of the optical communication link, the vulnerability associated with the narrow-band absorption.

In at least some embodiments, a digital signal processing (DSP) solution is identified to address instability in a continuous operating state of a coherent communication system, e.g., modem, that may stem from inaccuracies in a transceiver's estimate of transmission line properties produced by narrow, in-band phase and/or amplitude features related to gas absorption line notches. In present day modems, phase, amplitude, polarization and timing of transmitted data are recovered in part by a pair of filter types, e.g., as described in U.S. Pat. No. 8,385,747, incorporated herein by reference in its entirety. One of the filters exhibits a slower response, e.g., being designed to act in a manner independent of incoming polarization, sometimes referred to as common mode. Another filter may be faster, e.g., acting on a polarization dependent channel response. In continuous operation, the faster filter may also routinely accommodate common mode changes stemming from time evolution of the channel. To preserve an available dynamic range of the fast filter, an estimate of its common mode content may be used to periodically update the slow filter. Components of that estimate include residual second and third-order chromatic dispersion (CD) as well as relative delays of transmission sub-spectra. It has been observed through measurement of transmission performance that these estimates may be compromised in the presence of narrow molecular absorptions from gaseous contaminants, such as trace amounts of CO and/or $CO_2$ gas as may be found in hollow core fiber. It is understood that other transport media, including free-space optical transmissions, can also experience absorption lines due to a gas and/or other contaminant.

Present-day transceivers do not anticipate the possible presence of contaminant gas absorption as they have been designed for glass core fibers. The estimate of the common mode portion of the fast filter relies on a physical model of possible contributions that are slowly varying over the channel bandwidth. At least some of the example detection and/or mitigation techniques disclosed herein may augment that model to make it compatible with possible gas contamination in hollow core fiber. To that end, the techniques disclosed herein estimate and/or otherwise determine a frequency location and/or other characteristics of the gas amplitude line notches, e.g., estimating their amplitude versus frequency response. Responsive to such identifying and/or characterizing information, the disclosed techniques assess vulnerabilities, identify and/or otherwise initiate a mitigation strategy. Mitigation strategies may include some combination of exclude from the common mode estimate the portions of sub-spectra affected by narrowband features and/or estimate narrowband phase and removing it from the affected sub spectra before estimating the common mode update instruction for the slow filter. Accordingly, a new algorithmic step may be introduced to a common mode update estimate. The new algorithm accommodates a presence of narrow band response features. To reduce complexity, an incumbent update estimates a correction based on a physical model. This new step broadens the underlying physical model to include hollow core fiber applications and/or other free-space applications that may traverse a transmission medium with trace amounts of an absorbing compound.

FIG. 1 is a diagram of a non-limiting example of a communication network 100 in accordance with various aspects described herein. The communication network 100 may include at least one transmitter device 102 and at least one receiver device 104. The transmitter device 102 may be capable of transmitting signals over a communication channel, such as a communication channel 106. In one or more embodiments, the transmitter device 102 may be a modem and/or a transmit portion of a transceiver device. The receiver device 104 may be capable of receiving signals over a communication channel, such as the communication channel 106. In various embodiments, the transmitter device 102 may also be capable of receiving signals and/or the receiver device 104 may also be capable of transmitting signals. Thus, one or both of the transmitter device 102 and the receiver device 104 may be capable of acting as a transceiver.

The communication network 100 may include additional elements not shown in FIG. 1. For example, the communication network 100 may include one or more additional transmitter devices, one or more additional receiver devices, and one or more other devices or elements involved in the communication of signals in the communication network 100.

In some embodiments, the signals that are transmitted and received in the communication network 100 may include optical signals and/or electrical signals. For example, the transmitter device 102 may be a first optical transceiver, the receiver device 104 may be a second optical transceiver, and the communication channel 106 may be an optical communication channel. In certain embodiments, one or both of the first optical transceiver and the second optical transceiver may be a coherent modem.

In various embodiments, each optical communication channel in the communication network 100 may include one or more links, where each link may include one or more spans, and where each span may include a length of optical fiber and one or more optical amplifiers. Where the communication network 100 involves the transmission of optical signals, the communication network 100 may include additional optical elements not shown in FIG. 1, such as wavelength selective switches, optical multiplexers, optical de-multiplexers, optical filters, and/or the like.

Various elements and effects in an optical link between two communicating devices may result in the degradation of transmitted signals. That is, optical signals received over optical links can become distorted. Particularly, these signals may suffer from polarization mode dispersion (PMD), polarization dependent loss or gain (PDL or PDG), state of polarization (SOP) rotation, amplified spontaneous emission (ASE) noise, wavelength-dependent dispersion or chromatic dispersion (CD), nonlinear noise from propagation through fiber, and/or other effects. For instance, polarization effects of a fiber link tend to rotate the transmitted polarizations such that, at the receiver, they are neither orthogonal to each other nor aligned with the polarization beam splitter of the optical hybrid. As a result, each of the received polarizations (e.g., downstream of the polarization beam splitter) may contain energy from both of the transmitted polarizations, as well as distortions due to CD, PMD, PDL, etc. These problems may be compounded for polarization-division multiplexed signals in which each transmitted polarization contains a respective data signal. The degree of signal degradation due to noise and nonlinearity may be characterized by a signal-to-noise ratio (SNR) or, alternatively, by a noise-to-signal ratio (NSR). The signals transmitted in the communications network may be representative of digital information in the form of bits or symbols. The probability that bit estimates recovered at a receiver differ from the original bits encoded at a transmitter may be characterized by the Bit Error Ratio (BER). As the noise power increases relative to the signal power, the BER may also increase.

Figure 2A:
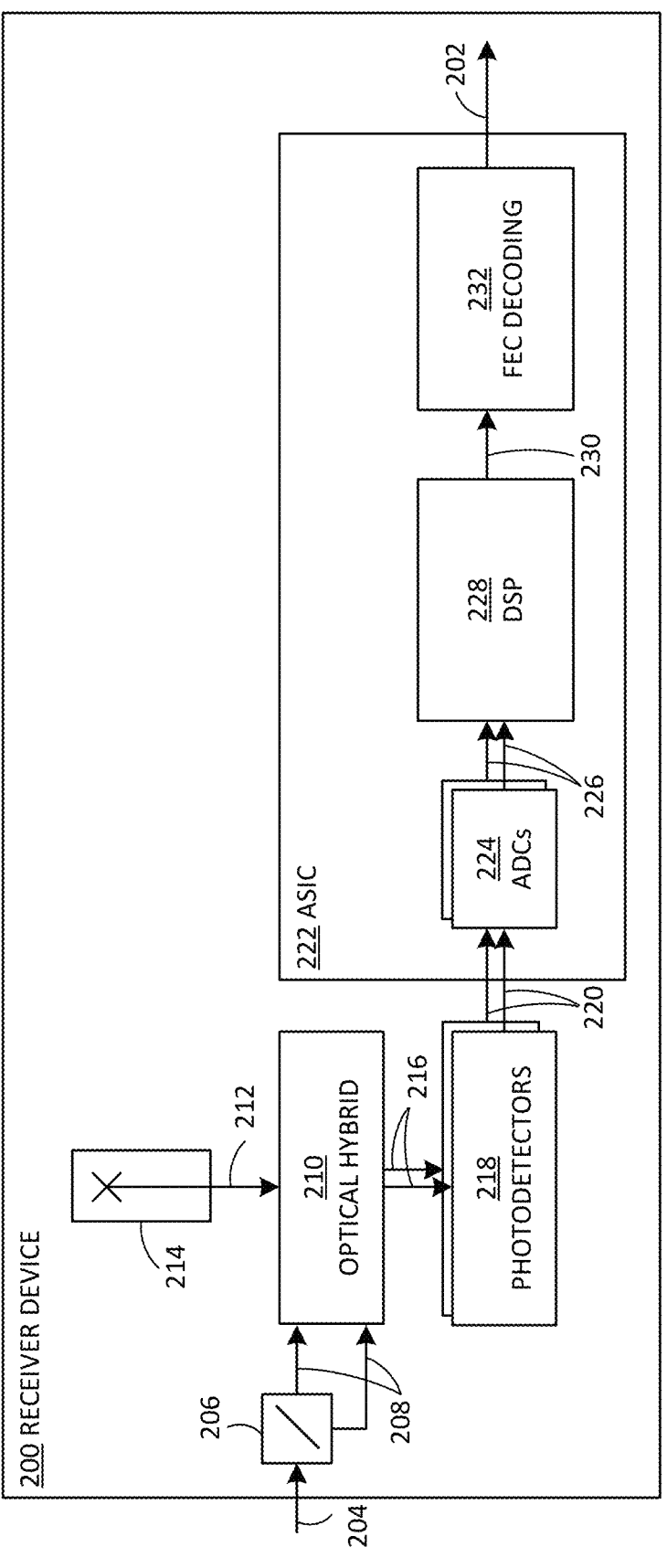
FIG. 2A illustrates an example receiver device in accordance with various aspects described herein.

FIG. 2A illustrates an example receiver device 200 in accordance with various aspects described herein. In various embodiments, the receiver device 200 may be the same as or similar to (or otherwise correspond to) the receiver 104 of FIG. 1 and may be configured to receive an optical signal 204, which may comprise a degraded version of an optical signal generated by a transmitter device (e.g., the transmitter device 102 of FIG. 1). The optical signal generated by the transmitter device may be representative of information bits (also referred to as client bits) which are to be communicated to the receiver device 200. The optical signal generated by the transmitter device may be representative of a stream of symbols. According to some examples, the transmitter device may be configured to apply forward error correction (FEC) encoding to the client bits to generate FEC-encoded bits, which may then be mapped to one or more streams of data symbols. The optical signal transmitted by the transmitter device may be generated using any of a variety of techniques, such as frequency division multiplexing (FDM), polarization-division multiplexing (PDM), single polarization modulation, modulation of an unpolarized carrier, mode-division multiplexing, spatial-division multiplexing, Stokes-space modulation, polarization balanced modulation, wavelength division multiplexing (WDM) (where a plurality of data streams is transmitted in parallel, over a respective plurality of carriers, where each carrier is generated by a different laser, e.g., a transmitter or Tx laser), and/or the like. For example, the receiver device 200 can facilitate in whole or in part an identifying of a narrow-band absorption occurring within a signal spectrum of the optical signal 204 when propagating through a gaseous medium, associating the narrow-band absorption with a vulnerability, and controlling a digital circuit, e.g., the ASIC 222 to mitigate at least a portion of the vulnerability.

The receiver device 200 may be configured to recover corrected client bits 202 from the received optical signal 204. The receiver device 200 may include a polarizing beam splitter 206 configured to split the received optical signal 204 into polarized components 208. According to one example implementation, the polarized components 208 may include orthogonally polarized components corresponding to an X-polarization and a Y-polarization. An optical hybrid 210 may be configured to process the components 208 with respect to an optical signal 212 produced by a laser 214, e.g., a receiver or Rx laser, thereby resulting in optical signals 216. Photodetectors 218 may be configured to convert the optical signals 216 output by the optical hybrid 210 to analog electrical signals 220. A frequency difference between an operating wavelength or frequency of the Tx laser and an operating wavelength or frequency of the Rx laser may be referred to as an Intermediate Frequency, and an offset of that away from nominal can be called fir. (The nominal difference is usually zero.) According to one example implementation, the photodetectors 218 generate analog signals 220 responsive to the optical signals 216 received from the optical hybrid 210, which may include four signals corresponding, respectively, to dimensions XI, XQ, YI, and YQ, where XI and XQ denote in-phase and quadrature-phase components of an X-polarization, while YI and YQ denote in-phase and quadrature-phase components of a Y-polarization. Together, elements such as the beam splitter 206, the laser 214, the optical hybrid 210, and the photodetectors 218 may form a communication interface configured to receive optical signals from other devices in a communication network.

As shown in FIG. 2A, the receiver device 200 may include a receiver processing device configured for a special application, such as an application specific integrated circuit (ASIC) 222. The receiver 200 may include one or more analog-to-digital converters (ADCs) 224 that are configured to sample the analog signals 220 and generate respective digital signals 226. In at least some embodiments, the ADCs 224 may be included within the ASIC 222. In certain alternate embodiments, the ADCs 224 or portions thereof may be separate from the ASIC 222. The ADCs 224 may sample the analog signals 220 periodically at a sample rate that is based on a signal received from a voltage-controlled oscillator (VCO) at the receiver device 200 (not shown).

The ASIC 222 may be configured to apply digital signal processing to the digital signals 226, e.g., using a digital signal processing (DSP) system 228. The digital signal processing (DSP) system 228 may be configured to perform processing that is designed to compensate for a variety of channel impairments, sometimes referred to as equalization. Example channel impairments that may be compensated by the DSP system 228 include, without limitation, one or more of CD, SOP rotation, mean PMD that determines the probability distribution which instantiates as differential group delay (DGD), PDL or PDG, and/or other effects. In at least some embodiments, the digital signal processing system 228 may further be configured to perform carrier recovery processing, which may include calculating an estimate of carrier frequency offset $f_{IF}$ (i.e., the difference between the frequency of the transmitter laser and the frequency of the receiver laser 214). According to some example implementations, the DSP system 228 may further be configured to perform operations such as multiple-input-multiple-output (MIMO) filtering, clock recovery, and FDM subcarrier demultiplexing. The DSP system 228 may also be configured to perform symbol-to-bit demapping (or decoding) using a decision circuit, such that processed signals 230 output by the DSP system 228 are representative of bit estimates. Where the received optical signal 204 is representative of symbols comprising FEC-encoded bits generated as a result of applying FEC encoding to client bits, the signals 230 may further undergo FEC decoding 232 to recover the corrected client bits 202.

According to some example implementations, the equalization processing implemented as part of the DSP system 228 may include one or more equalizers, some or all of which may be configured to compensate for impairments in the channel response. In general, an equalizer applies a substantially linear filter to an input signal to generate an output signal that is less degraded than the input signal. The filter may be characterized by compensation coefficients which may be incrementally updated from time to time (e.g., every so many clock cycles or every so many seconds) with the goal of reducing the degradation observed in the output signal.

According to some example implementations, the equalization processing of the DSP system 228 may include an equalizer filter (referred to herein as a "C filter") that is designed to apply a dispersive function to at least partially compensate for slowly changing channel impairments, such as CD. The C filter may be configured as a quasi-static dispersion-compensating filter and/or a spectral-shaping filter (i.e., that provides basic matched filter shaping). As an example, compensation coefficients for the C filter may be calculated through firmware using the estimated CD during start-up of the receiver device (also referred to as the acquisition stage), and those coefficients may be applied to received signals (e.g., by convolution in the time domain or by multiplication in the frequency domain), thereby resulting in processed signals which are, at least partially, compensated for CD. The C filter may be referred to as static or quasi-static because the updating of its compensation coefficients is relatively infrequent. For instance, the coefficients may be updated periodically (e.g., once every second) based on information obtained downstream during the digital signal processing. The slow rate of change of the compensation coefficients means that the static (or quasi-static) equalizer filter may only be capable of tracking and compensating for relatively slow changes in the channel response, and not fast changes. For example, the static (or quasi-static) equalizer filter may be able to compensate for changes in CD, which are typically at a rate on the order of about 1 Hz or slower, but the static (or quasi-static) equalizer filter may be unable to compensate for changes in SOP rotation, which typically happen much more quickly.

According to some example implementations, the equalization processing of the DSP system 228 may include an additional equalizer filter (referred to herein as an "H filter") which uses feedback to compensate for relatively fast changes in the channel response, such as SOP changes, PMD changes, PDL changes, small amounts of CD, and/or analog characteristics of the transmitter and receiver, which may change at a rate substantially greater than about 1 Hz. e.g., on the order of kHz. For example, the feedback-equalizer H filter may compensate for impairments varying at a rate of approximately 100 kHz. In various embodiments, feedback equalization of the H filter may rely on a least-mean-squares (LMS) feedback loop and/or adaptive Wiener filtering, e.g., using one or more of a constant modulus algorithm (CMA), an affine projection algorithm (APA), or a recursive least-squares (RLS) algorithm. For instance, feedback equalization may leverage frequency-domain RLS equalization. In various embodiments, feedback equalization may additionally, or alternatively, be implemented using blocks in the time domain.

In one or more embodiments, the tracking response of the H filter may be more than ten times faster than that of the C filter. For instance, one or more aspects of the optical coherent receiver described in U.S. Pat. No. 7,555,227 (which issued on Jun. 30, 2009, and is incorporated herein by reference in its entirety), may be employed in one or more systems/receivers described herein. For instance, one or more aspects of the equalization described in U.S. Pat. No. 7,555,227, which is separated into a C filter and an H filter, may be utilized in the receiver 200 of FIG. 2A herein.

If a number of Fast Fourier Transform (FFT) bins, N, for the H filter is, for example, 1024, the H filter can contain coefficients comprising 1024 2×2 complex-valued matrices. This example comprises 8192 real values. When each of these coefficients is tracking the impairments of the signal at hundreds of kHz or MHz, there is insufficient time for noise filtering (e.g., averaging) in the values of the coefficients. The example 8192 noisy coefficients may significantly degrade the quality of a signal being filtered and thus degrade the performance of the system.

In exemplary embodiments, the H filter of the DSP system 228 may be configured (e.g., with a "supercharger") to suppress the portions of an update outside of a time domain window that is significantly narrower than the time duration of the full equalizer. For instance, in one or more embodiments, one or more aspects of the equalizer described in U.S. Pat. No. 8,385,747 (which issued on Feb. 26, 2013, and is incorporated herein by reference in its entirety) may be employed in one or more systems/receivers described herein. As an example, one or more aspects of the supercharger 84 described in U.S. Pat. No. 8,385,747 may be utilized in or leveraged by the H filter of the receiver 200 of FIG. 2A herein. One purpose of the aforementioned suppression may be to allow fast tracking of polarization effects, with, for example, the aforementioned 8192 coefficients, while not suffering from the degradation which would occur if the full-time duration were tracked at that speed. For example, in a system with 1024 FFT bins in the frequency domain, the time domain window might be 33 samples long. Here, if a rectangular window is used, this reduces the noise energy in each of the 8192 real frequency domain coefficients by a factor of 1024/33. Time domain equalization methods are generally limited to a relatively short time domain interval, which might also be about 33 due to implementation gate count and coefficient noise.

In certain embodiments where the supercharger '84' of U.S. Pat. No. 8,385,747 is employed in the receiver 200 described herein, the supercharger may perform dynamic tracking at response rates of, for instance, hundreds of kHz or even some low MHz. There may be, for instance, thousands of (e.g., 8192) real coefficients in the frequency domain for such speeds. In various embodiments, the supercharger may dramatically reduce the dimensionality of what's being tracked, which can provide massive noise filtering on those coefficients.

What is being tracked at high speed generally has a much smaller number of dimensions—e.g., 33 out of 1000, which equates to 33 consecutive time domain samples, whose correspondence in the frequency domain is a broad smoothing of the characteristic. As a specific example, a multiplication by a rectangular time window produces the corresponding SINC convolution in the frequency domain, which smooths the frequency response. This means that the part that gets tracked at high speed has smooth characteristics in the frequency domain, which can also be referred to as low finesse.

Notwithstanding, other characteristics of a received signal in the frequency domain may have sharp or vertical edges (e.g., a rectangular shaped signal). More particularly, in exemplary embodiments, the optical signal transmitted by a transmitter device may be generated using FDM. FDM involves digitally dividing up the modulated optical spectrum into a plurality of subcarriers, each with a different center frequency, and using each subcarrier to transmit a signal that is representative of a respective stream of symbols. In this manner, a plurality of symbol streams may be simultaneously communicated, in parallel, over the optical communication channel. A typical FDM implementation involves sufficiently separating the frequencies of the subcarriers such that the bandwidths of the signals do not significantly overlap. Each subcarrier would then correspond to a different FDM sub-band, also referred to as an FDM channel.

It is desirable to pack FDM and/or wavelength division multiplexing (WDM) signals very close to each other, such that, for instance, roll-off factor $\rho=0.000$ with no guard bands, while not suffering from distortion due to neighboring signal energy. This helps to improve system spectral efficiency. However, non-zero fir at a coherent optical receiver can result in such distortion. More particularly, while a transmitting laser in the transmitter and the local oscillator laser in the receiver might nominally be the same, their exact frequencies are continuously changing during operations due to dithering effects. This results in a non-zero frequency difference between the two lasers—i.e., a non-zero $f_{IF}$.

Figure 2B:
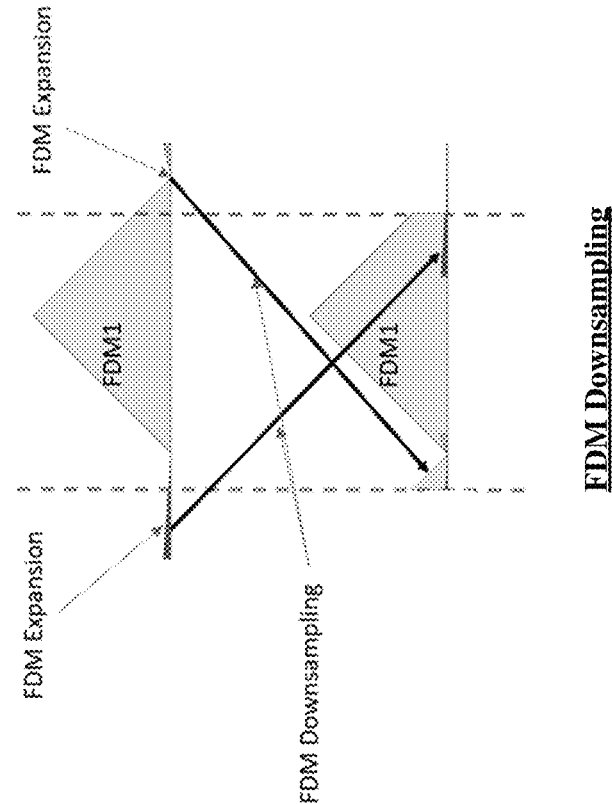
FIG. 2B illustrates how frequency division multiplexing (FDM) downsampling at an optical receiver affects an FDM signal in the frequency domain for a non-zero intermediate frequency (IF), in accordance with various aspects described herein.

FIG. 2B illustrates how FDM downsampling at an optical receiver affects an FDM signal in the frequency domain for a non-zero fir, in accordance with various aspects described herein. While the diagram of FIG. 2B shows a classical triangular shape for the FDM signal(s), this is for purposes of illustration only. It will be understood and appreciated that the actual shape of the FDM signal received at an optical receiver may be rectangular or the like with sharp/vertical edges, as described above. FDM downsampling adds to the highest bins of the FDM, those bins that are the FDM symbol rate lower in frequency, and adds to the lowest bins of the FDM, those bins that are the FDM symbol rate higher in frequency. The result of the downsampling is the frequency domain version of what, in the time domain, are symbol-spaced samples of one FDM signal.

When the IF shifts, which it continuously does over time (i.e., the value of IF keeps shifting back and forth about zero (0) IF), the above-described sharp/vertical edges of FDMs may also shift as well. FIG. 2C illustrates FDM expansion of neighboring FDMs in a case where fir is zero relative to a case where fir is non-zero, in accordance with various aspects described herein. The dashed lines 220 and 222 at the edges of FDM1 in FIG. 2C identify the delincations between FDM1 and its neighbors FDM0 and FDM2, respectively. As with FIG. 2B, here, it will similarly be understood and appreciated that the actual shape of the FDM signals received at an optical receiver may be rectangular or the like with sharp/vertical edges, as described above. In any case, the FDMs shown correspond to the transmission of parallel frequency domain signals that are all modulated on the same transmitting laser. As may be apparent in FIG. 2C, the FDMs may not be separated by any guard bands (e.g., zero guard bands) or may be separated by very small guard bands (e.g., guard bands that have less than the peak-to-peak variation in IF, such as guard bands that are less than about 2 GHz in size). For example, four or eight FDMs may be packed tightly together with little to no gaps in between them. As shown in FIG. 2C, a non-zero IF can result in the (e.g., entire) spectrum of the FDM signal being shifted in frequency one way or the other.

Optimally, the entirety of the signal energy of FDM1 is captured. However, with frequency shifting caused by non-zero IF, energy from the neighbors FDM0 and/or FDM2 may shift or expand into the areas between the dashed lines and energy of the FDM1 signal itself may shift or expand beyond the dashed line(s). One of these cases is shown in the non-zero IF diagram in FIG. 2C. Here, static processing/filtering "at" the right dashed line can result in data loss since a portion of the energy of FDM1 has shifted to higher frequencies. Similarly, static processing/filtering "at" the left dashed line would be interfered with by energy from FDM0 since a portion of the energy of FDM0 has also shifted to higher frequencies.

The above-described supercharger may not necessarily be capable of tracking the fine resolution, sharp/vertical edge of a given FDM due to the smoothness of the high-speed response. For instance, while LMS might be able to track sharp/vertical edges (fine granularity) at a much slower response, there is room for improvement. Fine granularity in the frequency domain generally has to be slow in order for time averaging (or equivalently, filtering) to reduce the total noise of (e.g., all of) the coefficients. Also, fine frequency finesse inevitably implies long impulse responses. The supercharger operation in the H filter can result in adjustments of terms with equivalently fine frequency finesse in the H filter to be much slower than those terms with a short impulse response if those fine terms are adjustable at all.

In exemplary embodiments, the equalization processing of the DSP system 228 may include yet another layer of equalizer filtering (referred to herein as an "X filter") that introduces "fine granularity" in the frequency domain as well as provides high frequency tracking of signal (e.g., FDM signal) edges.

In the frequency domain, if fir is not an integer multiple of FFT bin separation, the energy of each FDM subcarrier may spread to neighboring FDM subcarriers through SINC filter convolution, causing interference distortions. Handling such SINC effects in digital signal processing requires a high-speed circuit exploiting the out-of-band spread of each FDM subcarrier signal energy as well as removing the interference generated from neighboring FDM subcarriers through SINC convolution on the current FDM subcarrier. It is believed that no present digital processing systems are capable of handling these SINC effects at the required high tracking speeds. Various embodiments of the X filter, as described herein, are capable of addressing such SINC effects.

Tracking of FDM signal edges at a sufficient speed that accommodates for the changing IF is important to ensure that filtering for a given FDM is performed at or near the proper edges of a continuously shifting FDM. It is believed that no present digital processing systems track filtering at fine resolution and at fast enough speeds to respond to changes in the IF. Various embodiments of the X filter, as described herein, are capable of tracking signal edges at high enough speeds to respond to such changes in the IF. In one or more embodiments, the high frequency tracking may be associated with a small number of coefficients—e.g., 17 coefficients on each edge of an FDM signal.

Hardware implementations generally need to balance gate-count versus performance. Ignoring most of the implementation constraints, the X filter coefficients can be defined as a function of the Intermediate Frequency fir. A comprehensive result can be obtained by considering the global problem. In the case of a received signal comprising 8 FDM subcarriers, for instance, the global problem is an 8×8 MIMO with Nyquist duplication of frequencies that are the FDM-symbol-rate apart in each signal. Under non-zero laser IF ($f_{IF}$), we expect the 8×8 MIMO channel to deviate from the identity matrix, as crosstalk or interference across FDM subcarriers brings in non-zero non-diagonal elements to the matrix. This MIMO problem can be solved by well-known methods, but the solutions are generally too messy to be illustrative. Instead, for the sake of illustration, the solutions shown/discussed herein simply consider the local filtering near each edge between FDMs. Below are example calculations of desirable linear filtering coefficients for the frequencies near the edge of two adjacent FDMs, as a function of the Intermediate Frequency $f_{IF}$. For clarity of this example, it is assumed that all of the FDMs have equal symbol rates and equal spectral shapes.

Here, define N to be the total number of FFT bins, and W to be the number of FFT bins corresponding to the symbol rate of each FDM.

Calculate an impulse response corresponding to the desired spectral shape, $H_{FDM}$, for each FDM (advantageously, the result of a matched filter at zero IF offset). Convert to a time-domain impulse response:

$$h[t]==\text{IFFT}(H_{FDM}[f])$$

Apply the laser IF frequency offset, $f_{IF}$, to this impulse response. This SINC frequency interpolation can be conveniently performed in the time domain as the frequency offset is not generally an integer number of FFT bins.

$$h_{IF}[t] := h[t] \cdot e^{j2\pi f_{IF}t}$$

Calculate the effective frequency-domain response by applying a Fourier transform:

$$H_W[f]==\text{FFT}(h_{IF}[t])$$

Calculate the signal power spectrum:

$$P_S[f]=|H_W[f]|^2$$

Calculate the positive interferer power spectrum:
If FDM is NOT the positive outer FDM, then:

$$P_P[f] := P_S[f - W \bmod N]$$

Else: (There exists no positive interferer)

$$P_P[f]=0$$

Calculate the negative interferer power spectrum:
If FDM is NOT the negative outer FDM, then:

$$P_N[f] := P_S[f + W \bmod N]$$

Else: (There exists no negative interferer)

$$P_N[f]:=0$$

Calculate the channel noise spectrum, assuming white in this example:

$$P_0[f] := \frac{P_S}{10^{\frac{SNR}{10}}}$$

Calculate total noise+interference spectrum:

$$P_Z[f] := P_N[f] + P_P[f] + P_0[f]$$

Calculate the Wiener filter solution including the maximum ratio combining for this specific FDM (e.g., calculate the maximum ratio combining Wiener filter as):

$$H_O[f] := \frac{\frac{H_W[f] \cdot \sqrt{|H_W[f]|^2 + |H_W[f \pm W]|^2}}{P_Z[f]}}{1 + \frac{P_P[f]}{P_Z[f]} + \frac{P_P[f \pm W]}{P_Z[f \pm W]}}$$

It will be understood and appreciated that the foregoing example X filter solution can be implemented with pre-calculation, calculated "on the fly," learned, or otherwise approximated. Other forms of interpolation and/or extrapolation can be used. An advantageous implementation may pre-calculate the relevant elements of $H_O[f]$ and place those elements in a lookup table (LUT) that is addressed by a quantized estimate of $f_{IF}$. After each clock cycle, or every few clock cycles, the current estimate of fir may be used to select the coefficients that should currently be used. At a slower rate, say every 128 clock cycles, an approximation to the above calculation could be executed to calculate the coefficients that should currently be used. The $H_O[f]$ could be learned, such as by a CMA, LMS, or RLS algorithm, where the supercharger block discussed above can be modified to allow fine finesse for just the relevant FFT bins. The broad finesse may (e.g., must) be kept for the vast majority of bins to preclude excessive signal degradation due to noisy coefficients.

Embodiments of the X filter advantageously provide fine-finesse high-speed tracking of a small number of frequency terms of an equalizer to mitigate the effect of laser frequency transients on a gapless FDM system. In this way, FDMs (and/or WDMs) may be "closely packed" with one another despite the above-described sharp/vertical edge-related issue that may arise as a result of such packing.

It will be understood and appreciated that a wide enough gap in between FDMs would generally eliminate the problem that the X filter addresses. Thus, the X filter may be particularly applicable or useful in situations where there are no guard bands between FDMs or where FDMs are separated by very small guard bands (e.g., guard bands that have less bandwidth than the peak-to-peak variation in IF).

In exemplary embodiments, the X filter may be configured to perform filtering for each FDM signal (i.e., each individual FDM signal of a multiple-FDM system). For instance, X filter coefficients for each FDM signal may be determined using LMS function(s). Assume, as a non-limiting example, that there are 1280 FFT bins across the spectra of a given FDM signal, where $\rho=0.000$ and over-sampling $N=5/4$. In this example, and for simplicity of explanation, the FFT bins may be in order of frequency as follows: $f=-639$ to $f=+640$, with $f_{DC}=0$. Here, (e.g., rectangular) cut-off edges of the signal may be at $f=-4*1280/5/2+1=-511$ and at $f=+512$.

In one or more embodiments, the X filtering may be centered at the edges of a given FDM signal. Here, K bins may be centered at each of the two edges as X filter zones. In embodiments where the X filter is upstream of the H filter, more digital gates may be required for the X filter in addition to gates needed for the H filter. High speed tracking by the X filter can thus be resource intensive (or expensive), and so the number of bins K to use for each of the two edges should generally be small relative to the total number of FFT bins across the spectra. For instance, in the above-mentioned example where there are 1280 FFT bins, the value of K should be in the range from 12 to 48. In some embodiments, the value of K may depend on the desired frequency shift for the X filtering—e.g., a shift of 1 GHz in frequency may correspond to a particular number of FFT bins and thus K may be set to that number (or to a value that is within a threshold of that number). As an example, if 1280 FFT bins wide corresponds to a 50 GBaud FDM symbol rate, a 1 GHz peak-to-peak IF deviation would need 26 bins (1280/50=25.6). For hardware efficiencies, this might be lowered to $K=24$ or $K=16$. As the spectra is shifted due to a laser transient, the X filter can rapidly respond and perform filtering of each FDM signal.

In various embodiments, and as discussed above, desired coefficients for the X filter may be predetermined and prestored in a data structure (e.g., a lookup table or the like) along with corresponding IF values. The IF can be (e.g., continuously) tracked/estimated, where coefficients corresponding to the estimate of the IF can be obtained/read into the X filter. In essence, the location of a brick-wall edge of an FDM signal can be controlled by an estimate of the IF. This allows the X filter to provide desired equalization for each of different locations between bins of the brick-wall edge of the signal—e.g., at hundreds of KHz or several MHz in speed.

In certain embodiments, the X filter can be configured to filter only inside of the edges of an FDM signal at zero IF. That is, all of the FFT bins for the X filter can be inside of the edges of the FDM signal. While this might result in slightly lower performance, it allows the value of K to be half as large relative to the value of K in the aforementioned case where the X filtering is otherwise centered at the edges of the FDM signal. For example, the value of K may be in the range from 6 to 24. In some embodiments, the C filter may be used to zero (or otherwise filter) the energy outside of the edges.

In alternate embodiments, the X filter can be configured to filter only outside of the edges of an FDM signal at zero IF. Here, the X filter may only operate outside of the nominal structure, thus similarly allowing the value of K to be half as large relative to the value of K in the aforementioned case where the X filtering is otherwise centered at the edges of the FDM signal. For example, the value of K may be in the range from 6 to 24.

Since multiplication is commutative and associative, a plurality of coefficients that are to be applied to one FFT bin can be multiplied together before multiplying that FFT bin of the signal. Alternatively, they can sequentially multiply that FFT bin. Specifically, an X filter coefficient can be applied through modification of a C filter multiplication, or through modification of an H Filter multiplication, or with its own multiplication. The X filter multiplication can be done in parallel to, and instead of, the H filter multiplication. Quasi-static or scaling aspects might be separated from the high-speed aspects. Cartesian coordinates are used in the examples here, for clarity. Polar coordinates or other coordinate systems can be used. The choices between any such mathematical equivalents can depend upon the hardware and control implications.

In one or more embodiments, the X filter may be used to optimize the frequency bins used for each FDM. For a zero IF, the X filter coefficients may be controlled towards zero. However, for a positive IF, the X filter coefficients may be defined to pass the signal energy on the positive side of the FDM spectrum and to block noise by decreasing the signal energy on the negative side of the FDM spectrum.

FIG. 2D illustrates X filtering of FDM expansions at edges of an FDM signal for zero IF and non-zero IF, in accordance with various aspects described herein. As shown in FIG. 2D, in a case of zero IF, energy from neighbor FDMs may be suppressed by the X filter, and in a case of non-zero IF, portions of energy of neighbor FDMs may be suppressed by the X filter and other portions passed by the X filter.

In one or more embodiments, a frequency finesse of the X filter may be per FFT bin. Even though the laser IF is continuously moving and thus may move much more finely than per FFT bin, it is nevertheless believed to be a reasonable finesse. In alternate embodiments, the frequency finesse of the X filter may be per an integer multiple of an FFT bin—e.g., per 2 FFT bins, per 4 FFT bins, per 5 FFT bins, etc., or per a certain correlation function across 2 FFT bins, 4 FFT bins, 5 FFT bins, etc.

The fine finesse of the X filter can be contrasted to that of the H filter. Particularly, while the H filter may have a smooth filtering characteristic such that the finesse of its coefficient updates are much less than an individual FFT bin itself, the H filter's responses are much broader than per FFT bin. For instance, while the H filter may have 16 or 32 degrees of freedom across 1024 FFT bins, the responses are much broader—e.g., they may cover 30, 50, or 60 FFT bins, where all 1024 FFT bins may be adjusted, but the adjustments may be the same for a given FFT bin and its 30 or 50 neighboring FFT bins and yet much different from adjustments of FFT bins that are further away. As an example, the H filter's response may be smooth in frequency such that the variation of the H-filter's response across neighboring 30 . . . 60 FFT bins is very small.

Figure 2E:
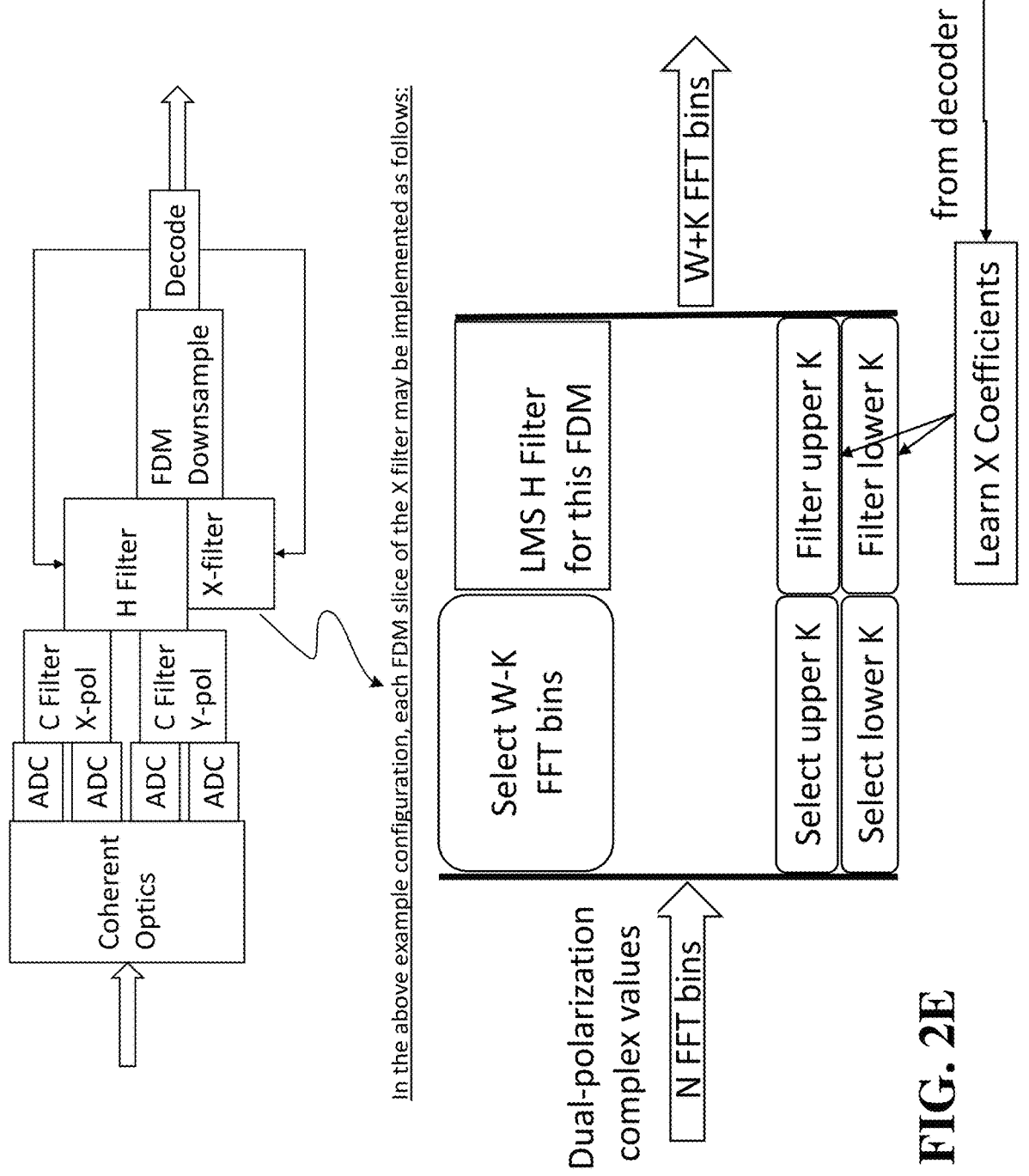
FIG. 2E illustrates an example, non-limiting embodiment of a coherent optical receiver with an X filter implemented in parallel with an H filter, in accordance with various aspects described herein.
Figure 2F:
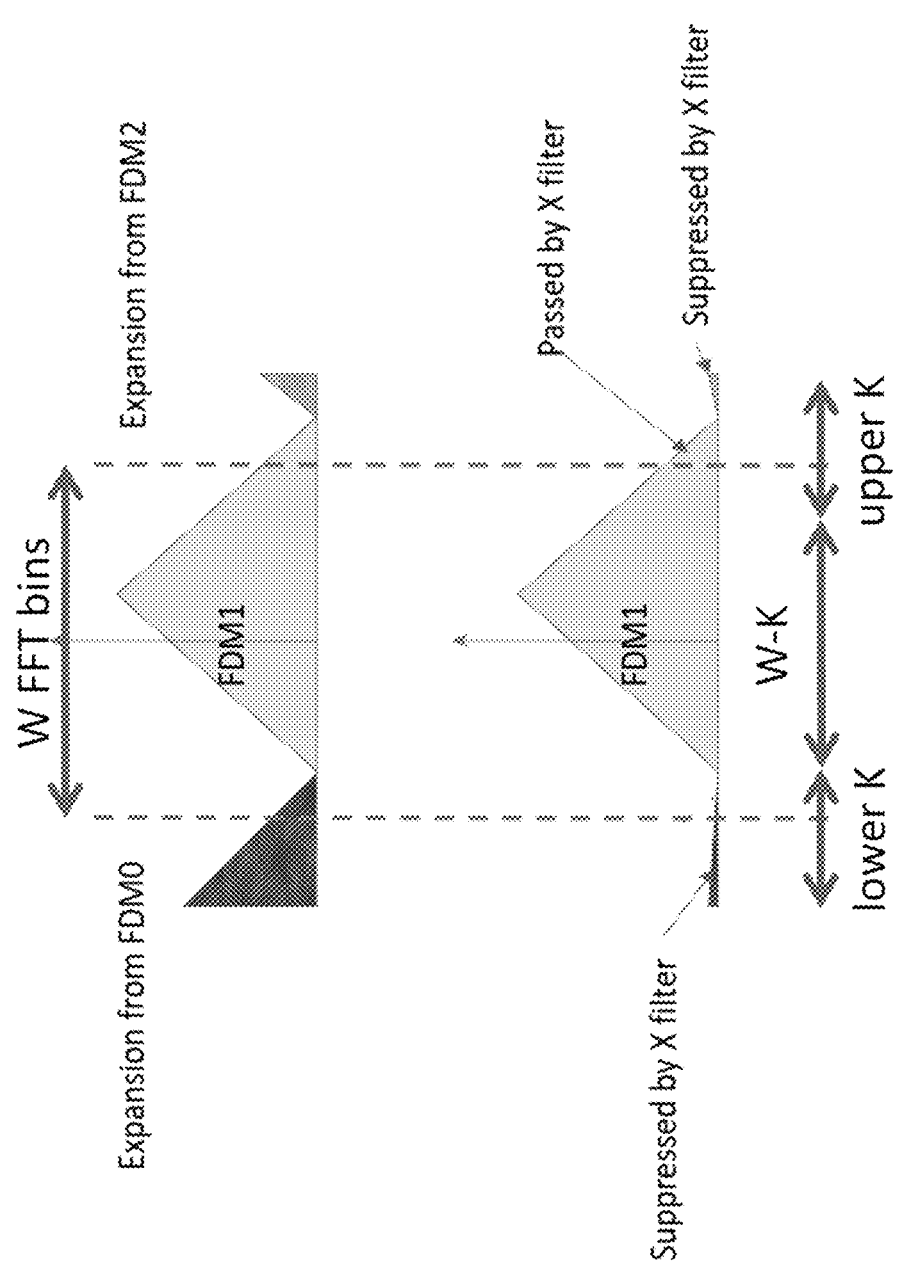
FIG. 2F illustrates how values may be defined for the X filter—namely the number W of FFT bins and the choice K for upper and lower bins—in accordance with various aspects described herein.

The X filter may be partially or entirely integrated with the H filter or separate from the H filter. In certain embodiments, the X filter may be implemented in parallel with the H filter. In one or more embodiments, the aforementioned supercharger may be modified to provide X filtering functionality. In these embodiments, the X filter functionality may be in parallel to the H filter. FIG. 2E illustrates an example, non-limiting embodiment of a coherent optical receiver with an X filter implemented in parallel with an H filter in accordance with various aspects described herein. For example, the coherent optical receiver device can facilitate in whole or in part an identifying of a narrow-band absorption occurring within a signal spectrum of a received optical signal propagating through a gaseous medium, an associating of the narrow-band absorption with a vulnerability, and a controlling a digital circuit, e.g., the H filter and/or the X filter to mitigate at least a portion of the vulnerability. FIG. 2F illustrates how values may be defined for the X filter—namely the number W of FFT bins and the choice K for upper and lower bins—in accordance with various aspects described herein. The supercharger is a smoothing function for LMS updates to coefficients for the H filter. In some embodiments, the supercharger may be modified so as to not suppress aspects of the updates of H filter coefficients. This means that certain FFT bins may be selected to not be subjected to the smoothing, but rather to have high finesse and updated at a higher speed. As an example, out of 1024 FFT bins, K upper and K lower FFT bins may be specially designated. The frequency domain LMS can then control coefficients for each of these 2*K FFT bins so as to achieve high-speed tracking. Since updates of these particular 2*K coefficients would not be suppressed (or would not be significantly suppressed) by the supercharger, sharp frequency delineation may be achieved simultaneously with fast tracking.

As K is much smaller than the size of the FFT, there is minimal performance impact on the total signal from coefficient noise. This is in contrast to otherwise performing high-speed updates for all 1024 bins, since this would result in excess coefficient noise due to the high tracking speed, and thus cause too much penalty on the overall FDM signal. In any case, the foregoing implementation of the X filter via a modified supercharger can provide a full-rate adjustment to a small number of fine frequency finesse terms.

Figure 2G:
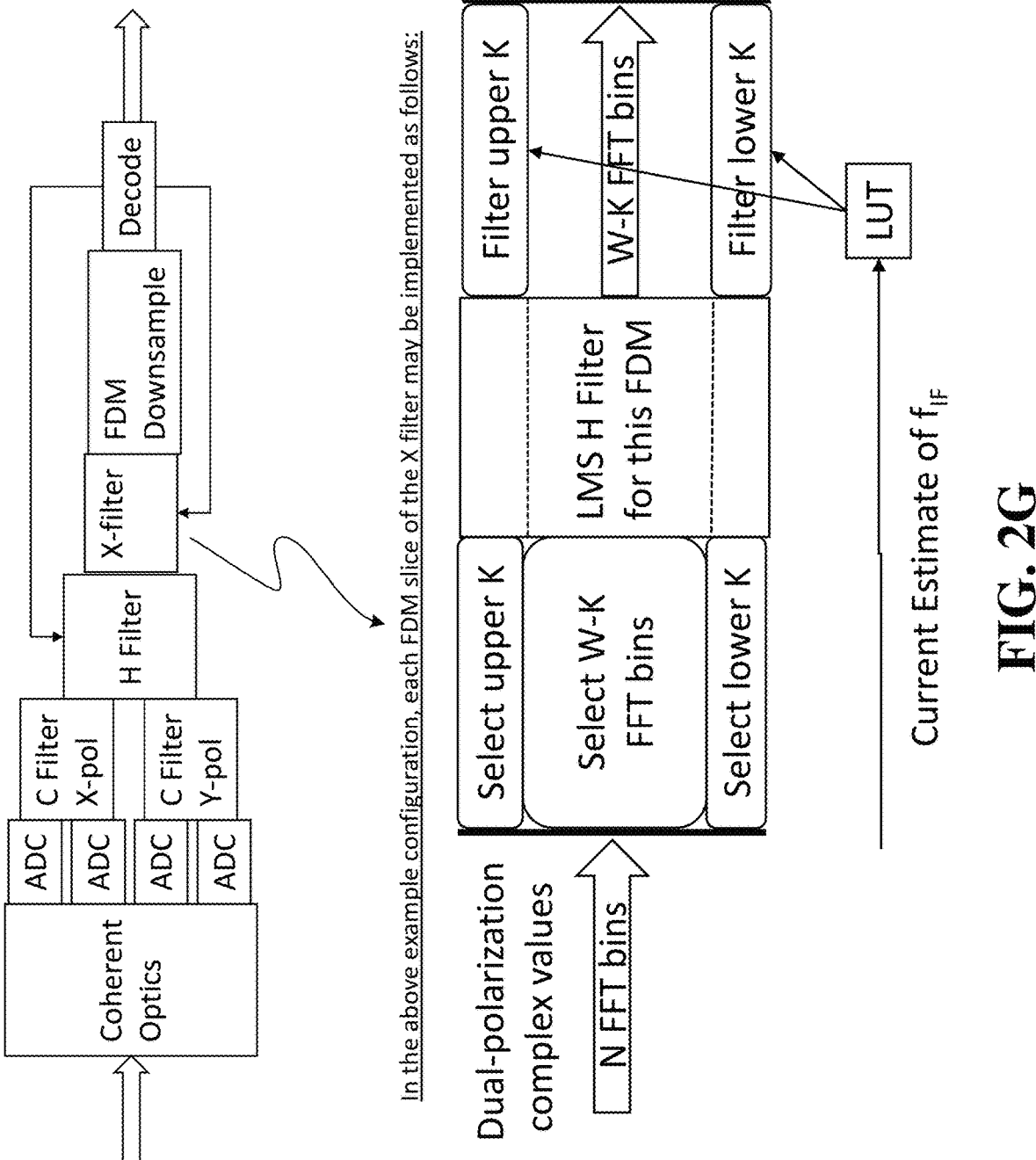
FIG. 2G illustrates an example, non-limiting embodiment of a coherent optical receiver with an X filter implemented downstream of an H filter, in accordance with various aspects described herein.
Figure 2H:
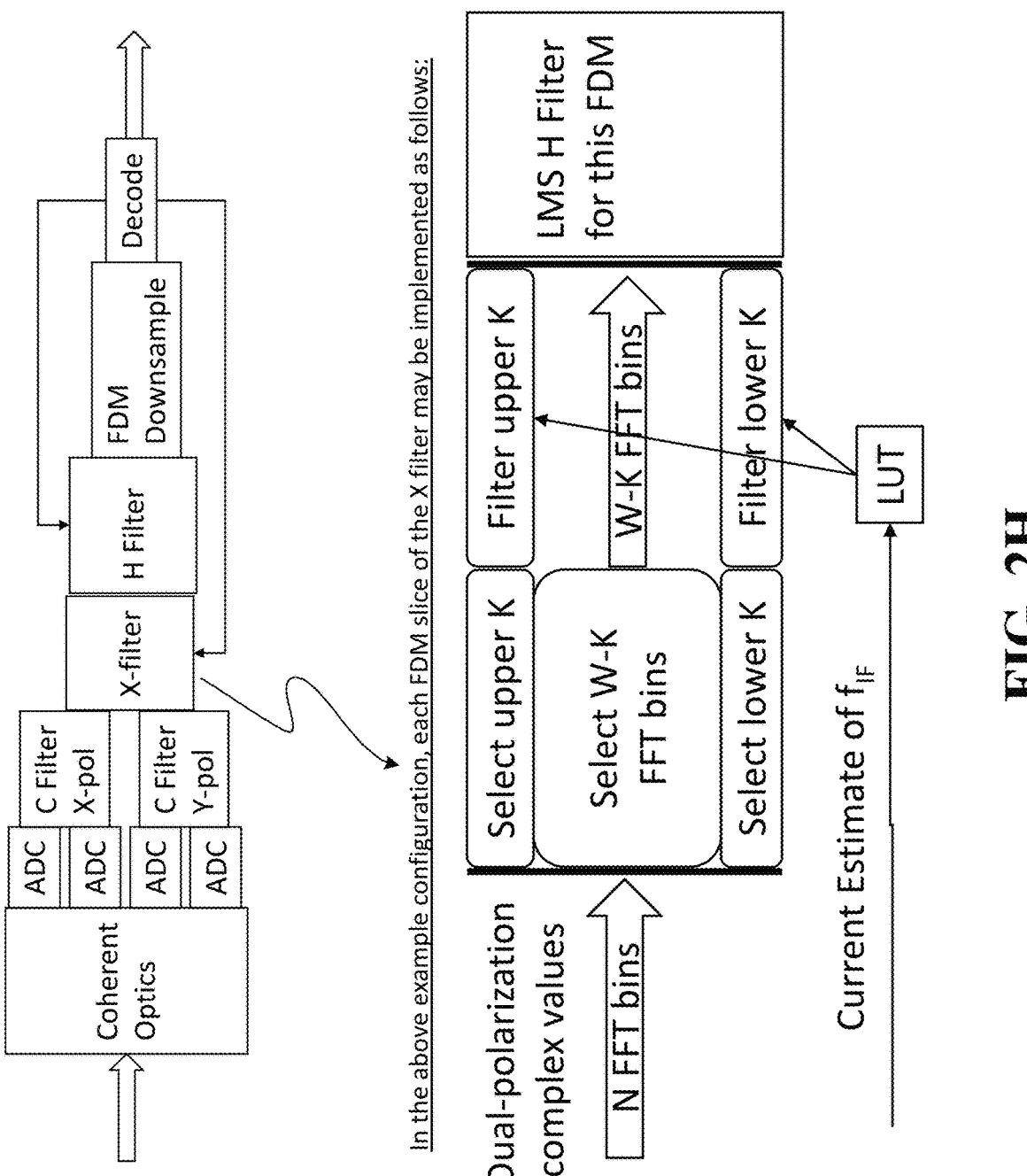
FIGS. 2H and 2I illustrate an example, non-limiting embodiment of a coherent optical receiver with different implementations of an X filter that is upstream of an H filter, in accordance with various aspects described herein.
Figure 2I:
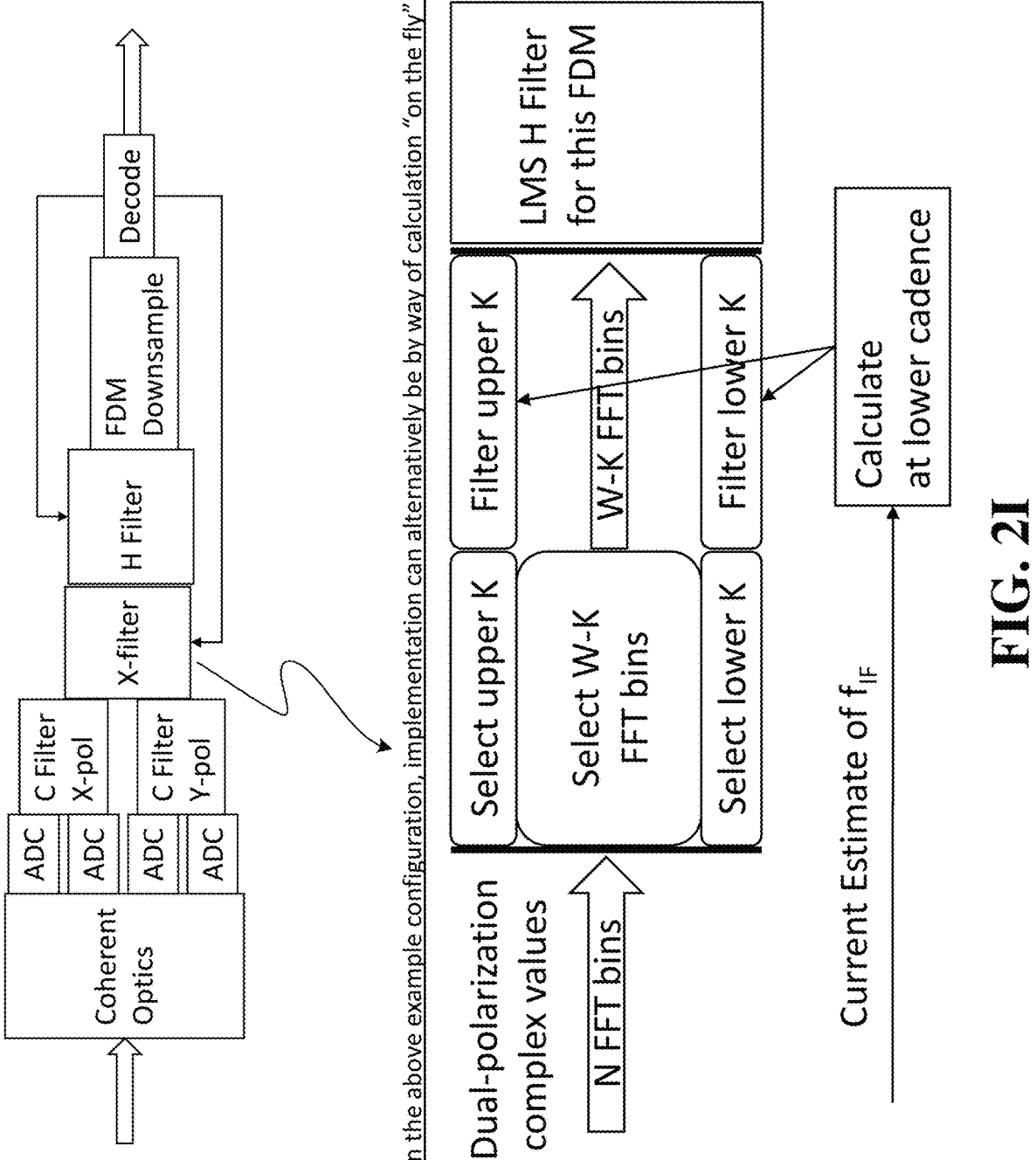

In various embodiments, the X filter may be implemented downstream or upstream of the H filter. FIG. 2G illustrates an example, non-limiting embodiment of a coherent optical receiver with an X filter implemented downstream of an H filter, in accordance with various aspects described herein. FIGS. 2H and 2I illustrate an example, non-limiting embodiment of a coherent optical receiver with different implementations of an X filter that is upstream of an H filter, in accordance with various aspects described herein. In the embodiments shown in FIGS. 2G, 2H, and 2I, the X filter may have its own control—e.g., based on LMS, RLS, approximated RLS, constant modulus, etc.—where coefficients for a small (e.g., preselected) number of frequency bins may be updated at a higher speed and at higher finesse. For example, the coherent optical receiver devices of FIGS. 2G, 2H and 2I can facilitate in whole or in part an identifying of a narrow-band absorption occurring within a signal spectrum of a received optical signal propagating through a gaseous medium, an associating of the narrow-band absorption with a vulnerability, and a controlling a digital circuit, e.g., the H filter and/or the X filter to mitigate at least a portion of the vulnerability.

In various embodiments, the X filter coefficient updates may be driven by the estimate of the IF and/or other control parameters. Thus, SINC interpolation can be controlled by the estimate of the IF. For instance, as discussed above, desired coefficients for the X filter may be stored in a lookup table along with corresponding IF values. In one or more embodiments, the IF estimate may be obtained from a carrier recovery function of the decoder. It is to be understood and appreciated that gradient methods or other methods may be used for any of the control parameter(s). In any case, the LUT may be driven to generate coefficients for the X filter as a specific response to the IF, where the outputs of the X filter may then be multiplied by the H filter (see FIG. 2H).

In various embodiments, each X filter coefficient may be independently controlled. In some embodiments, the coefficients may be coupled, or subspace controlled. In one or more embodiments, a straight-line vs. frequency can be controlled by (e.g., only) its slope. For example, if the X filter bins are integer numbered from f=−8 to f=+8, then X [f]:=minimum (1.0, maximum (0.0, 0.5+slope*f)).

While the X filter has been described as being configured to suppress energy of neighboring FDMs based on tracking of the IF, there are additional applications of the X filter and/or additional effects that the X filter can provide. As an example, the ability of the X filter to react to optical edges with finer finesse allows for a gentler roll-off (i.e., gentler than an FFT) at edges of the spectrum that may be "damaged" by amplifiers and/or optical filters (e.g., wavelength selective switches) on the propagating signal. For instance, the X filter may repair damage that is done by such amplifiers and/or optical filters.

In exemplary embodiments, the X filter is advantageously used with a rectangular signal spectrum (i.e., ρ=0.000). Alternatively, the X filter can be used with non-zero values of p and with non-root-raised-cosine spectral shapes. The nominal signal spectrum may have a windowed, trimmed, or truncated impulse response.

In various embodiments, the X filter is advantageously used at the edge of a signal, for a fixed set of FFT bins. The frequency locations of the bins of the X filter may be fixed, provisioned by firmware, and/or adaptively tracked.

In various embodiments, the roll-off factor for an FDM stream (e.g., each FDM stream) may be less than a predefined value. As some examples, the predefined value may be equal to (or may be about or less than) 0.07 or 0.01. In one or more embodiments, the frequency separation between centers of neighboring FDM streams of symbol rates B1 and B2 may be less than a constant multiplied by (B1+B2) in Hertz. As an example, the constants may be equal to (or may be about or less than) 0.535 or 0.505.

While a frequency domain implementation, after an FFT, is desirable and is described in examples herein, it will be understood and appreciated that a time domain finite impulse response (FIR) or matrix or other implementation may alternatively be used to implement the X filter.

Also, while the X filter is described herein as being capable of mitigating interference from neighboring signals, the X filter may be capable of additionally, or alternatively, mitigating other sources of degradation. For instance, the X filter may be capable of mitigating dynamic degradation effects over spectral ranges that have long time domain responses—e.g., a narrow spectral peak or notch, a sharp optical filter edge, a pump laser, an idler, an optical tone, an optical service channel, a four-wave mixing product of narrow sources, and/or other narrow nonlinear effects.

Two edges of one FDM have been considered and discussed herein for X filtering. Alternatively, X filtering may be implemented for only one edge of an FDM. It is to be understood and appreciated that the spectral ranges of the X filter may be non-contiguous and scattered so long as the total amount of spectrum is a small fraction of the spectral width of the signal.

For clarity, real values have been used in the examples for the X filter coefficients. However, the values can be complex or complex matrices may be used. In various embodiments, frequency domain multiplication, per FFT bin, by a complex coefficient may be employed in any of the filtering described herein. The coefficient can be amplitude only. Further, the coefficient can be only 0 or 1. Other implementations can alternatively be used.

FIG. 3 depicts an illustrative embodiment of a process 300 in accordance with various aspects described herein.

At 302, the process 300 can include obtaining a signal received at a coherent optical receiver. For example, the process 300 may include obtaining a signal received at a coherent optical receiver 200.

At 304, the process 300 can include equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter. For example, the process 300 may include equalizing the signal using a filter system, wherein the filter system includes an X filter that provides a first filtering characteristic, an H filter that provides a second filtering characteristic, and a C filter that provides a third filtering characteristic, wherein an adjustment rate of the X filter and an adjustment rate of the H filter are each at least ten times an adjustment rate of the C filter, and wherein the adjustment rate of the X filter is at least ten times the adjustment rate of the H filter. For example, the C filter may be adjusted at one Hertz, the X filter may be adjusted at one Megahertz, and most of the dimensions of the H filter may be adjusted at 10 Kilohertz. Through the aforementioned (e.g., modified) supercharger, a small number of other dimensions of the H filter may have faster adjustments, e.g., 600 Kilohertz or 2 Megahertz. Thus, a filter can have more than one adjustment rate. In other words, while the tracking speed of the H filter has been described as being significantly slower than the tracking speed of the X filter, in certain embodiments, dimensions (e.g., some or all dimensions) of the tracking of the H filter may not necessarily be significantly slower than the tracking speed of the X filter. Notwithstanding, the frequency finesse of the H filter may still be coarser than that of the X filter. For instance, in exemplary embodiments, the frequency finesse of the X filter may be at least four times finer than the frequency finesse of the H filter. In some embodiments, the frequency finesse of the X filter may be at least eight times finer than the frequency finesse of the H filter.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the processes and/or methods described herein.

Propagation of optical signals through at least some transmission media, e.g., gases, such as CO or $CO_2$, can experience narrow attenuation bands, i.e., notches, in a frequency spectrum of the signal. In at least some instances, these notches may be due, at least in part, to absorption by a material present in the transmission media. When the absorption notches are due to a gaseous composition, they may be referred to as gas absorption lines, or simply "gas lines."

For example, hollow core fibers at lengths of about 10 km may produce a first increase in CO absorption depth within one transmission band, e.g., a 0.4 dB increase the C-band, and a second, vastly different increase of CO2 absorption depth within another transmission band, e.g., a 4 dB increase within the L-band. The amount of absorption and center frequency of a gas line may depend on one or more of a gas concentration, a gas pressure, a gas type and a signal-gas interaction length. By way of example, a full width of the notch, at half depth in dB, may be about 350 MHz in air at about ⅓ atmospheric pressure. Such gasses can be present in hollow core fiber, in free space, and/or dissolved in liquids or even solids. Propagation along multiple amplified optical transmission links including such media may result in an accumulation of significant notch depths that may degrade the optical signal. It is understood that other narrow absorption line responses may include color centers in solid transmission media.

Advantageously, according to the techniques disclosed herein, the presence of a gas absorption line notch may be detected in a coherent receiver. At least one such detection technique obtains a transfer function of the optical transmission medium and correlates the transfer function with a predetermined record of any gas line notches, e.g., a gas attenuation line attenuation template. Such correlations may also measure a frequency, or wavelength, location relative to an optical signal transmitted through the transmission medium and/or relative to an IF, e.g., an IF utilized by a receiver processing the optical signal to obtain digital information conveyed thereby. In at least some embodiments, a depth of an observed notch may also be measured. It is conceivable that in at least some embodiments, a measured notch may have a depth that exceeds a measurement dynamic range of the receiver or modem. In such instances, a correction may be applied to determine and/or otherwise derive a representative notch depth, e.g., from a known line shape. In at least some embodiments, a spectrum of a gas absorption line notch may be measured by averaging receiver captures of a transmission spectrum, e.g., averaging square magnitudes of repeated receiver captures. Alternately, or in addition, a field magnitude spectrum may be measured by averaging repeated receiver captures of a recovered field. In such instances, the repeat captures may be adjusted for phase coherence, e.g., by removing time-varying phase (linewidth). It is understood that such correlations may use real and/or complex values, e.g., utilizing real and/or complex gas absorption line reference templates. In at least some embodiments, a transfer function of an optical transmission medium may be advantageously obtained utilizing a test signal, e.g., obtaining receiver measurements of an optical transmission test signal injected at a distal end of the transmission medium.

Gas absorption lines may be associated with known absolute frequency locations. However, in practical applications, the locations, depths, widths and/or other expected characteristics of a gas absorption line may vary to at least some degree. For example, gas absorption lines may be subject to collisional broadening and/or shifting depending on gas composition. Precise locations and/or general neighborhoods of such locations may be made digitally accessible, such as in a table or function. Other factors that may lead to variations in detection of gas absorption lines may result from inaccuracies and/or instability of equipment of the optical link. For example, frequencies of a transmitter Tx laser and/or a receiver Rx laser may be approximately known. Similarly, a symbol rate may be known to some specificity, e.g., to within about 4.6 ppm. From these known and/or estimated variances or tolerances, the risk of a presence of a gas-line notch within a signal spectrum may be calculated. For example, a frequency location of a gas attenuation line relative to the signal and/or to the IF may be estimated. In at least some embodiments, such calculations may be automated, e.g., within the transmission equipment or network control, so as not to require human intervention.

An optical transmission medium may be characterized. For example, a speed-of-light delay in each direction between two ends of a bidirectional optical transmission system may be used to bound a length of the transmission medium. It is understood that techniques for characterizing optical transmission media, such as those described in U.S. Pat. No. 6,687,464, incorporated herein by reference in its entirety, may be used to estimate physical properties of an optical transmission medium, such as its type and/or length. Alternatively, or in addition, location estimation methods, such as those disclosed in U.S. Pat. No. 7,376,358, may be used to characterize the transmission medium. In at least some embodiments, characterization of a transmission medium and/or details regarding gas absorption line notches may be obtained from other sources. For example, digital information may be shared between optical transmission equipment operating at other WDM wavelengths that may be at least partially copropagating with a particular WDM wavelength under investigation. Alternatively, or in addition, characteristic information of the transmission medium and/or details regarding gas absorption line notches may be obtained by information shared from a reverse direction of the optical link. This may be possible, because characteristics of the optical medium are often correlated between the paths of the two directions of a bidirectional system. In at least some instances, a human can enter digital controlling information about a transmission medium, e.g., identifying whether the particular link traverses any hollow-core fiber. Human entered information may include digital controlling information about an expected characteristics of gas-line notches. It is understood that any of the detection and/or characterization techniques disclosed herein regarding gas absorption lines and/or transmission media, may be combined without restriction.

Figure 4:
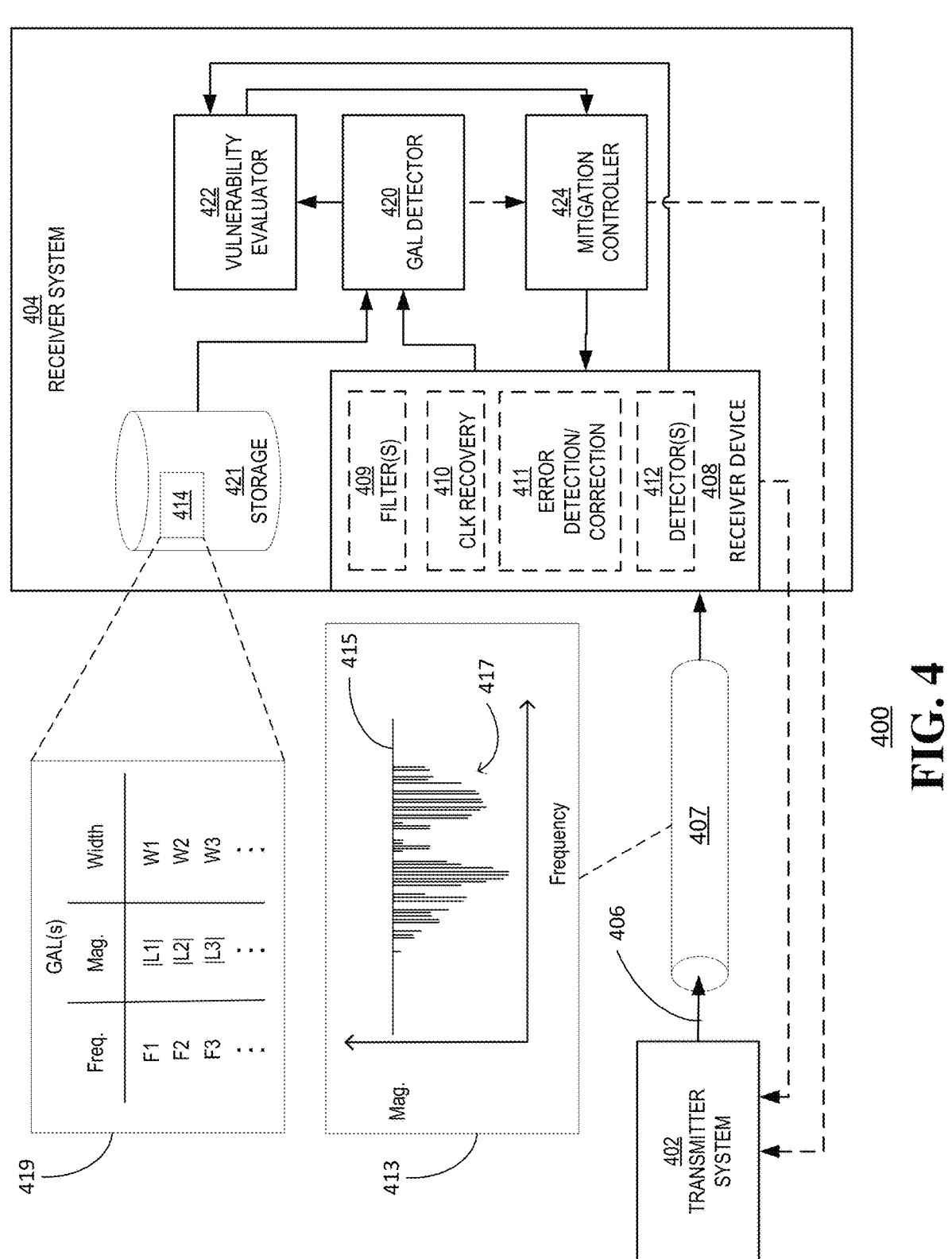
FIG. 4 illustrates an example gas-absorption-line resistant coherent optical communication system in accordance with various aspects described herein.

FIG. 4 illustrates an example gas-absorption line (GAL) resistant coherent optical communication system 400 in accordance with various aspects described herein. The GAL-resistant coherent optical communication system 400 may include at least one transmitter system 402 and at least one receiver system 404. The transmitter system 402 may be capable of transmitting signals over a communication channel, such as the example communication channel 406. At least a portion of the communication channel 406 may traverse at least a portion of an optical transmission medium 407. Without limitation, the optical transmission medium 407 may include an optical waveguide, such as a solid-core optical waveguide, a hollow-core optical waveguide, or some combination of both. Without limitation, optical waveguides may include optical fibers. Alternatively, or in addition, at least a portion of the optical transmission medium 407 may include free space, which may include a vacuum, e.g., space, a gaseous composition, e.g., air, or some combination of both. In one or more embodiments, the transmitter system 402 may include a transceiver, such as a modem. The receiver system 404 may be capable of receiving signals over a communication channel, such as the example communication channel 406. In various embodiments, the transmitter system 402 may also be capable of receiving signals and/or the receiver system 404 may also be capable of transmitting signals. Thus, one or both of the transmitter system 402 and the receiver system 404 may be capable of acting as a transceiver, e.g., a modem.

The GAL-resistant coherent optical communication system 400 may include additional elements not shown in FIG. 4. For example, the GAL-resistant coherent optical communication system 400 may include one or more additional transmitter systems, one or more additional receiver systems, and one or more other devices or elements involved in the communication of signals in the GAL-resistant coherent optical communication system 400.

In some embodiments, the signals that are transmitted and received in the GAL-resistant coherent optical communication system 400 may include optical signals and/or electrical signals. For example, the transmitter system 402 may be a first optical transceiver, the receiver system 404 may be a second optical transceiver, and the communication channel 406 may be an optical communication channel. In certain embodiments, one or both of the first optical transceiver and the second optical transceiver may be a coherent modem.

In various embodiments, each optical communication channel in the GAL-resistant coherent optical communication system 400 may include one or more links, where each link may include one or more spans, and where each span may include an optical transmission medium, e.g., a length of optical fiber, and one or more optical amplifiers. Where the GAL-resistant coherent optical communication system 400 involves the transmission of optical signals, the GAL-resistant coherent optical communication system 400 may include additional optical elements not shown in FIG. 4, such as wavelength selective switches, optical multiplexers, optical de-multiplexers, add-drop multiplexers, WDM devices, optical filters, and/or the like.

According to the illustrative embodiment, the transmitter system 402 provides an optical signal that is configured to communicate digital information. In at least some embodiments, the optical signal includes an optical carrier signal operating at a nominal carrier frequency or wavelength. The transmitter system 402 may impress digital information, e.g., bits, onto the optical carrier signal by modulating one or more of an amplitude, a phase and/or a frequency of the optical carrier signal to obtain a modulated optical carrier signal. The modulated optical carrier signal may be injected into a proximal end of the optical transmission medium 407, which, in turn, may support propagation of the modulated optical carrier signal from the transmitter system 402 to the receiver system 404. It is understood that in at least some scenarios one or more physical properties of the optical transmission medium may introduce one or more undesirable effects to the modulated optical carrier signal as may be observed and/or otherwise realized at the receiver system 404. Undesirable effects may include, without limitation, one or more of signal attenuation, phase delay, chromatic dispersion, group delay, polarization dispersion. In at least some scenarios, e.g., in which the optical transmission medium 407 includes a gaseous substance, the undesirable effects may include one or more narrow absorption bands or lines that may result in a substantial attenuation and/or phase variation over a relatively narrow portion of channel spectrum. These narrow absorption bands may adversely affect performance when they occur within and/or adjacent to the communication channel.

By way of example, adverse performance may include one or more of a loss of clock, a decreased signal-to-noise ratio (SNR), an increase in bit errors, an increase and/or introduction of inter-symbol interference, and so on. Alternatively, or in addition, the narrow absorption bands may adversely impact the operation of equalization filters. For example, the narrow absorption bands may interfere with operation of one or more of the example H filters, C filters and/or X filters. Consequently, the equalization filter(s) may not provide an intended level of equalization, e.g., resulting in a greater group delay, a greater chromatic dispersion and/or a greater polarization dispersion than would otherwise be attainable with the equalization filter(s) in the absence of the narrow absorption bands.

In more detail, the example receiver system 404 includes a receiver device 408 in communication with the optical transmission medium 407. The receiver device 408 may include one or more of a filter module 409, a clock recovery module 410, an error detection and/or correction module 411 and/or a detector 412. In at least some embodiments, the filter module 409 includes at least one equalization filter, e.g., including one or more of the example H filters, C filters and/or X filters disclosed herein. The filter module 409 may apply equalization to a received coherent optical signal to obtain an equalized signal. To the extent receiver operations are synchronized, e.g., according to one or more of a symbol rate and/or a bit rate associated with digital information, the clock recovery module 410 may recover and/or otherwise generate a local clock at the receiver system 404 using any of the example clock recover techniques disclosed herein and/or otherwise generally known in the field of digital communications. To the extent that the received coherent optical signal includes an error detection and/or correction feature, the error detection and/or correction module 409 may apply error detection and/or correction, e.g., according to a parity scheme and/or forewarned error correction. The detector module 412 may include a decoder to decode digital information as may have originated from an external source, such as the transmitter system 402.

The example receiver system 404 further includes one or more of a GAL detector 420, a vulnerability evaluator 422, a mitigation controller 424 and/or a storage device 421. The storage device 421 may be configured to store one or more records of predetermined gas absorption lines for one or more gaseous compositions, e.g., CO and/or CO2. The stored GAL records may include GAL reference records 419, e.g., identifying frequencies and/or wavelengths associated with GALs. In at least some embodiments, the GAL reference records 419 may include graphs and/or tabulated results and/or algorithms that identify one or more details of the GALs, such as their locations, corresponding depths of absorption notches and/or widths of the notches and/or corresponding phase offsets associated with the absorption notches.

The example GAL detector 420 is in communication with one or more of the receiver device 408, the vulnerability evaluator 422 and the storage device 421. The example mitigation controller 424 is in communication with one or more of the receiver device 408 and the vulnerability evaluator 422. In at least some embodiments, the vulnerability detector 422 is in further communication with the receiver device 408. The GAL detector 420 may be configured to detect one or more occurrences of narrow-band absorptions within an operational channel and/or received signal spectrum of the communication channel 406. Detection may include one or more of measuring a transfer function 413 of the optical transmission medium 407, e.g., by way of a communication signal of opportunity and/or a test signal provided by the transmitter system 402 and received at the receiver device 408. The transfer function may include one or more of a magnitude component and/or a phase component. For example, the magnitude component 415 that may include one or more narrow-band absorption notches 417 at corresponding frequency locations. In at least some embodiments, detection may include a correlation, e.g., a comparison, of the transfer function 415 and/or the individual narrow-band absorption notches 417 to the GAL reference records 419. To the extent that a narrow-band absorption notch 417 is observed in the transfer function and correlated to the GAL reference records 419, the notch may be associated with a particular gas absorption line. In at least some embodiments, detection and/or correlation of one or more such gas absorption lines may be used to identify a composition of a gaseous medium of the optical transmission medium 407. To the extent that a narrow-band absorption notch 417 is observed in the transfer function and correlated to the GAL reference records 419 but is distorted by linearity of the measuring apparatus its true absorption and/or phase can be reconstructed for use from the reference record 419.

The GAL detector 420 may provide an indication of a detected gas absorption line to the vulnerability evaluator 422, e.g., including one or more of its location in frequency and/or wavelength, its depth and/or its width. The vulnerability evaluator 422 may obtain configuration data of one or more of a configuration of the receiver device 408 and/or configurations of one or more of the filters 409, the clock recovery module 410, the error detection and/or correction module 411 and/or the detectors 412. The vulnerability evaluator 422 may be configured with logic and/or instructions that are adapted to determine and/or otherwise identify one or more potential vulnerabilities according to the detected gas absorption line and the configuration data. To the extent that a vulnerability is determined, the vulnerability evaluator may provide an indication of the vulnerability to the mitigation controller 424. The mitigation controller 424, in turn, may identify one or more mitigation strategies responsive to an indication of a potential vulnerability. In at least some embodiments, the mitigation controller 424 generates a digital control, providing it to the receiver device 408 and/or one or more of the filters 409, the clock recovery module 410, the error detection and/or correction module 411 and/or the detectors 412. In at least some embodiments, the digital control may be configured to alter a configuration of one or more of the receiver device 408 and/or one or more of the filters 409, the clock recovery module 410, the error detection and/or correction module 411 and/or the detectors 412. When implemented, the mitigation control may avoid the perceived vulnerability, and/or otherwise induce an adjustment and/or reconfiguration adapted to reduce and/or correct for the perceived vulnerability.

The example GAL detector 420 is provided at a receiver end of the optical transmission medium 407, e.g., integrated into the receiver system 404. It is understood that in at least some embodiments, one or more of the GAL detector 420, the vulnerability evaluator 422 and/or the mitigation controller 424 may be located elsewhere in the GAL-resistant coherent optical communication system 400. For example, the GAL detector 420 may be located at a transmitter end of the optical transmission medium 407. e.g., integrated into the transmitter system 402. For example, measurement of the transfer function 413 may be accomplished by the transmitter system 402 using an optical time domain reflectometer (OTDR), e.g., using a tunable wavelength. Without limitation, it is further understood that one or more of the GAL detector 420, the vulnerability evaluator 422 and/or the mitigation controller 424 may be located at one or more other locations, such as an intermediate location along the optical transmission medium 407 and/or according to some distributed arrangement of the GAL detector 420, the vulnerability evaluator 422 and/or the mitigation controller 424 at various locations including, but not limited to, the transmitter system 402, the receiver system 404 and/or some intermediate location along the optical transmission medium 407.

It is envisioned that in at least some embodiments, the GAL detector 420 may be in communication with the mitigation controller 424. For example, the GAL detector 420 may provide an indication of a detected gas absorption line to the mitigation controller 424, e.g., including one or more of its location in frequency and/or wavelength, its depth and/or its width. The mitigation controller 424 may be configured with logic and/or instructions that are adapted to determine and/or otherwise identify one or more potential vulnerabilities based on the detected gas absorption line. In at least some embodiments, it may not be necessary for the receiver system 404 to include a separate vulnerability evaluator 422, e.g., a vulnerability being determined by another module, such as the mitigation controller 424.

Figure 5:
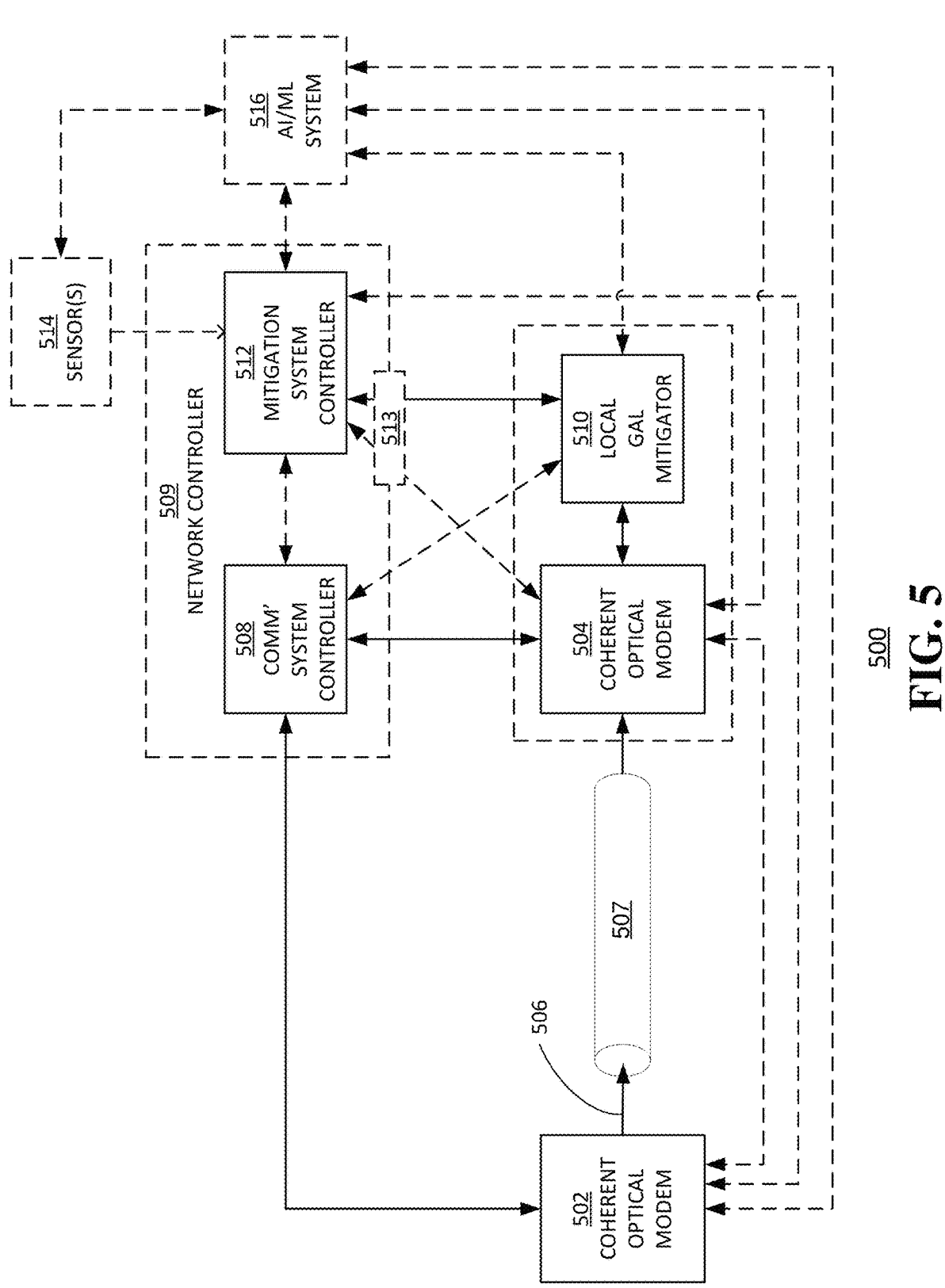
FIG. 5 illustrates another example gas-absorption-line resistant coherent optical communication system in accordance with various aspects described herein.

FIG. 5 illustrates another example GAL-resistant coherent optical communication system 500 in accordance with various aspects described herein. The GAL resistant coherent optical communication system 500 includes a first coherent optical modem 502 at a first end of an optical transmission medium 506 and a second coherent optical model 504 at a second end of the optical transmission medium 506. The first coherent optical modem 502 may be capable of transmitting optical signals over an optical communication channel. At least a portion of the communication channel may traverse an optical transmission medium 507. Without limitation, the optical transmission medium 507 may include an optical waveguide, such as an optical fiber. Optical fibers may include solid-core optical fibers, hollow-core optical fibers, or some combination of both. Alternatively, or in addition, at least a portion of the optical transmission medium 507 may include free space, which may include a vacuum, e.g., space, a gaseous composition, e.g., air, or some combination of both. In one or more embodiments, the first coherent optical modem 502 may include a first optical transceiver. The second coherent optical modem 504 may be capable of receiving signals over a communication channel 506 traversing the example optical transmission medium 507. In various embodiments, the first coherent optical modem 502 may also be capable of receiving signals and/or the second coherent optical modem 504 may also be capable of transmitting signals. Thus, one or both of the first coherent optical modem 502 and the second coherent optical modem 504 may be capable of acting as a transceiver.

According to the illustrative embodiment, the first coherent optical modem 502 provides an optical signal that is configured to communicate digital information. In at least some embodiments, the optical signal includes an optical carrier signal operating at a nominal carrier frequency or wavelength. The first coherent optical modem 502 may impress digital information, e.g., bits, onto the optical carrier signal by modulating one or more of an amplitude, a phase and/or a frequency of the optical carrier signal to obtain a modulated optical carrier signal. The modulated optical carrier signal may be injected into a proximal end of the optical transmission medium 507, which, in turn, may support propagation of the modulated optical carrier signal from the first coherent optical modem 502 to the second coherent optical modem 504. It is understood that in at least some scenarios one or more physical properties of the optical transmission medium 507 may introduce one or more undesirable effects to the modulated optical carrier signal as may be observed and/or otherwise realized at the second coherent optical modem 504. Undesirable effects may include, without limitation, any of the examples disclosed herein, including narrow absorption bands or lines that may result in a substantial attenuation and/or phase variation over a relatively narrow portion of channel spectrum.

In at least some embodiments, the second coherent optical modem 504 is in communication with a local GAL mitigation system 510. The local GAL mitigation system 510 may include one or more of a GAL detector 420, a storage device 421 storing GAL reference records 419, a vulnerability evaluator 422 and/or a mitigation controller 424 (FIG. 4). In at least some embodiments, the local GAL mitigation system 510 may operate independently of another coherent optical modem and/or optical transmission medium 507.

The example resistant coherent optical communication system 500 includes a communication system controller 508 in communication with one or more of the first and second coherent optical modems 502, 504. In at least some embodiments, the communication system controller 508 may provide digital control of one or more of the first and second coherent optical modems 502, 504 to provide provisioning, monitoring, configuring and/or re-configuring of the first and second coherent optical modems 502, 504. In at least some embodiments, the communication system controller 508 may include at least one communication network control function. Network control functions may include, without limitation, network routing, coherent optical link selection, optical carrier frequency, wavelength and/or channel selection and/or assignment, equipment configuration, e.g., transmitter, receiver, transceiver and/or modem configuration and/or selection, error correction schemes, clock distribution and/or recovery schemes, and so on. For example, the communication system controller 508 may assign to the communication channel 506, a particular wavelength of a wavelength division multiplexed system conveying multiple wavelengths across the optical transmission medium 507. Alternatively, or in addition, the communication system controller 508 may configure the first and second coherent optical modems 502 according to one or more of a data rate, a modulation scheme, a channel coding scheme and the like.

In at least some embodiments, the communication system controller 508 is in communication with the local GAL mitigator 510 and/or a mitigation control system controller 512. The mitigation control system controller 512, in turn, may be in communication with the local GAL mitigator 510. The mitigation system controller 512 may detect, determine and/or otherwise identify a narrow band absorption corresponding to a gas absorption line of a gaseous composition of the optical transmission medium 507. Responsive to an identification of the GAL, the mitigation system controller 512 may identify a mitigation strategy. The mitigation strategy may include an adjustment and/or reconfiguration of one or more adjustable and/or configurable parameters of the first coherent optical modem 502, the second coherent optical modems 504, or a combination of both. In at least some embodiments, mitigation control system controller 512 provides one or more digital controls to adjust and/or configure the adjustable and/or configurable parameters. Alternatively, or in addition, the mitigation control system controller 512 provides a digital control to the communication system controller 508, which in response thereto, provides one or more digital controls to adjust and/or configure the adjustable and/or configurable parameters.

It is understood that, in at least some embodiments, the system 500 may include a network controller 509 (shown in phantom). The network controller 509 may include at least a portion of the communication system controller 508 and at least a portion of the mitigation system controller 512. For example, at least some network control, GAL detection, evaluation and/or mitigation control may be performed in a distributed manner, e.g., within and/or proximal to one or more other network components of the system 500, such as one or more of the coherent optical modems 502, 504.

In at least some embodiments, the network controller 509 includes a detector interface 513 (shown in phantom) configured to receive a detected narrow-band absorption, e.g., from one or more of the coherent optical modem 504 or the local GAL mitigator 510. The detected narrow-band absorption may occur within a frequency spectrum of an optical signal propagating through a gaseous medium, wherein the optical signal is configured to communicate digital information via an optical communication link of a plurality of optical communication links of a communication network. The mitigation system controller 512 may be configured to control one or more digital circuits to mitigate at least a portion of a vulnerability of the optical communication link, associated with the detected narrow-band absorption. In at least some embodiments, the digital circuit includes a network configuration function configured to mitigate at least a portion of the vulnerability by adjusting a configuration of the communication network via the network configuration function.

It is envisioned that in at least some embodiments, the GAL resistant coherent optical communication system 500 may optionally include an artificial intelligence (AI) and/or machine learning (ML) system 516 (shown in phantom). For example, the optional AI/ML system 516 may be in communication with one or more of the mitigation system controller 512 and/or the local GAL mitigator 510. The AI/ML system 516 may operate according to a model that may be suitably trained to identify one or more of a GAL notch, a mitigation strategy and/or one or more digital controls to adjust and/or configure the adjustable and/or configurable parameters responsive to a detected GAL. In at least some embodiments, a suitably trained model of the AI/ML system 516 may identify the one or more of the GAL notches, the mitigation strategy and/or digital controls to adjust and/or configure the adjustable and/or configurable parameters responsive to the detected GAL in view of a state of the GAL resistant coherent optical communication system 500. The state may include frequency assignments, wavelength assignments, modulation schemes, data rates, clock management and/or recover, detection schemes, channel coding, equalization filter configurations, and the like.

In at least some embodiments, the GAL resistant coherent optical communication system 500 may include one or more sensors 514. Without limitation, the sensors 514 may include an environmental sensor that may be adapted to detect one or more of a temperature, a pressure, e.g., an atmospheric pressure, light, e.g., sunlight, humidity, salinity, vibrations, and so on. It is understood that in at least some scenarios, a physical feature of a gas absorption line, e.g., a location, a depth and/or a width, may vary according to an environmental condition, such as sunlight and/or temperature. An indication of an environmental condition, e.g., output data of the one or more sensors 514, may be provided to one or more of the mitigation system controller 512 and/or the AI/ML system 516. In at least some embodiments, the mitigation system controller 512 may select and/or otherwise modify a mitigation strategy responsive to an environmental condition according to output data of the one or more sensors 514. A mitigation strategy may depend at least in part on an environmental condition, such as a temperature, sunlight and the like, such that a different mitigation strategy may be selected depending upon the environmental condition. In at least some embodiments, a model of the AI/ML system 516 may consider an environmental state or condition, such that the AI/ML system 516 may identify the one or more of the mitigation strategy and/or the digital controls to adjust and/or configure the adjustable and/or configurable parameters responsive to the detected GAL in view of an environmental condition and/or a state of the GAL resistant coherent optical communication system 500.

For situations in which avoidance of a perceived vulnerability includes a reconfiguration, coordination among multiple system components may be required. For example, vulnerability avoidance by changing a channel location may include at least some level of co-ordination between a receiver and a remote transmitter. In at least some embodiments, such coordination may be achieved by a communication exchange between the receiver and the transmitter. For example, the receiver device 408 may be in communication with the transmitter system 402 (FIG. 4). Alternatively, or in addition, coordination may be achieved by intervention of another device, such as a communication with a wider network controller, e.g., the network controller 509 (FIG. 5) coordinating a reconfiguration, such as a channel change, with one or both of the receiver and transmitter.

In at least some embodiments, one or more of the communication system controller 508, the mitigation system controller 512 and/or the AI/ML system 516 (FIG. 5) may be in communication with one or more of the network transceivers, e.g., the coherent optical modems 502, 504. For example, one or more of the controllers 508, 512 and/or AI/ML system 516 may receive input from some or all of the network transceivers, e.g., the coherent optical modems 502, 504. It is envisioned that in at least some embodiments, detection of a vulnerability and/or identification of a mitigation strategy may rely at least partly upon collaboration among two or more of the controllers 508, 512 and/or the AI/ML system 516, and/or the network transceivers, e.g., the coherent optical modems 502, 504. Decisions may be synthesized in whole or in part from such collaborative communications.

It is worth noting here that inter-device communications may be accomplished via the optical transport medium 407, 507, e.g., via in-band and/or sideband communications. Alternatively, or in addition, such inter-device communications may be accomplished via a different network path and/or via a different transport medium. Different transport media may include, without limitation, optical fiber communications, free-space optical communications, wired communications, wireless communications, e.g., via terrestrial radio links and/or satellite communication links and so on.

Figure 6A:
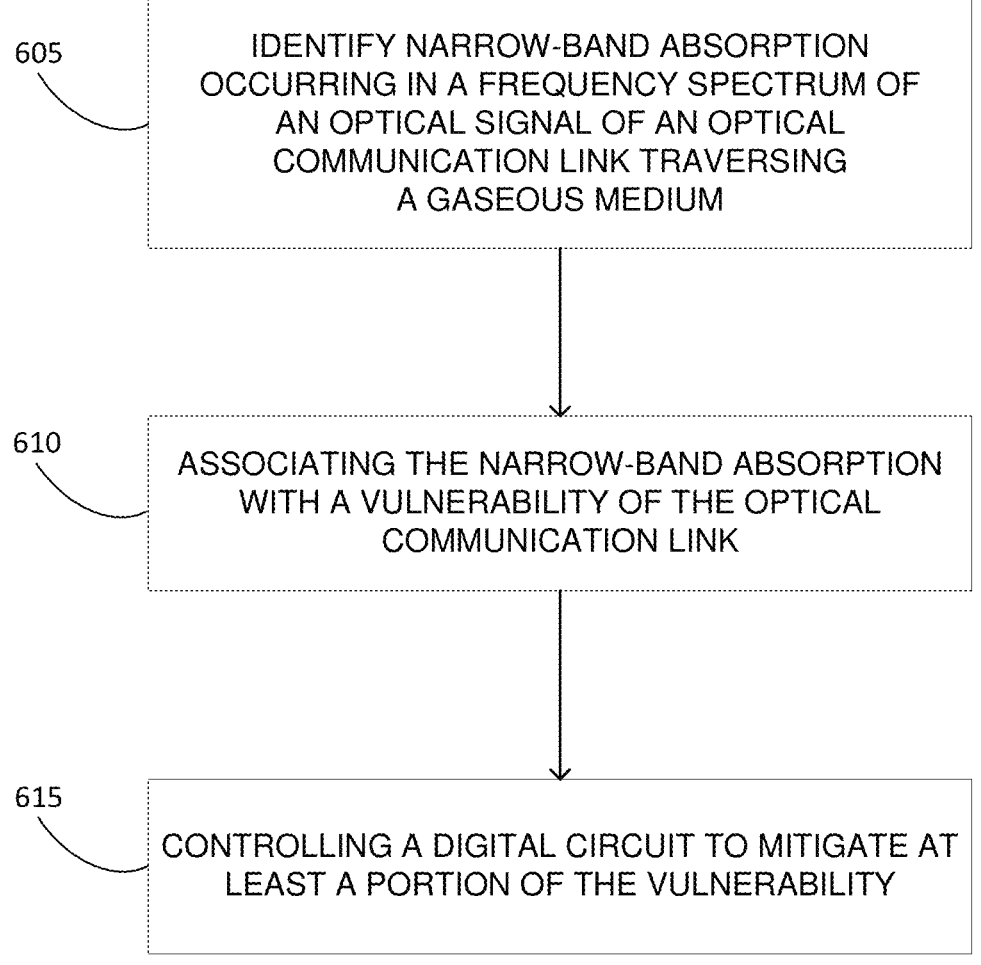

FIG. 6A depicts an illustrative embodiment of a gas absorption line (GAL) mitigation process 600 in accordance with various aspects described herein. According to the example GAL mitigation process 600, a narrow-band absorption is identified at 605, occurring in a frequency spectrum of an optical signal of an optical communication link traversing a gaseous medium. According to the example GAL mitigation process 600, the narrow-band absorption is associated at 610 with a vulnerability of the optical communication link. Further according to the example GAL mitigation process 600, a digital circuit is controlled at 615 to mitigate at least a portion of the vulnerability.

By way of example, at least one mitigation strategy addresses vulnerabilities due to laser instability. One or more of a transmitter laser and/or an LO laser in a coherent optical communication system may exhibit variations in their operational frequency or wavelength. For example, there are often FM dithers applied to the lasers. Other effects include microphonic effects that may operate to convert a mechanical vibration to a frequency deviation. Still further examples of laser instability may result form instability of an associated power supply and/or electromagnetic interference (EMI) effects may offset and/or vary the laser frequencies. It is also understood that laser frequencies and/or gas absorption line notches may drift with temperature and/or device aging. Such variations may tend to translate, shift and/or otherwise move a frequency location of a gas absorption line notch relative to a spectral location, e.g., relative to the signal spectrum and/or the IF spectrum. An effective mitigation method identifies, measures, estimates and/or otherwise track one or more such transients. Having identified the transients, identification of gas absorption line notches, application of filter techniques to mitigate adverse effects of gas absorption line notches and/or general operation of the optical communication link may be adjusted to accommodate and/or otherwise impart a tolerance of these transients. At least one approach identifies a frequency margin according to the transients. The frequency margin may be considered in measurement and/or in estimation of gas absorption line notches and/or in any mitigating filter adjustments.

Alternatively, or in addition, a mitigation strategy may operate an optical communication system, e.g., a WDM system, in such a manner so as to avoid at least some spectral regions associated with gas absorption line notches. For example, WDM spectral locations containing gas-line notches can be avoided when configuring and/or otherwise deploying initial wavelengths of a WDM system. It is recognized that optical channel bandwidth is a valuable quantity. As such, it is desirable to make use of as much available spectrum as possible, particularly as an optical band becomes filled with signals. Providing headroom for laser frequency transients mean that significant spectrum remains unused if one tries to place the signals away from potential locations of gas-line notches. The methods of U.S. Pat. No. 10,211,919, incorporated herein by reference in its entirety, may be used to move one or more parts of an optical channel spectrum away from an identified and/or otherwise anticipated gas absorption line notch.

A gas line notch attenuates that region of the spectrum occupied by the notch. The notch attenuation reduces optical signal power and introduces a distortion due to interference, e.g., inter symbol interference (ISI). Accordingly, the notch adversely impacts signal power and/or fidelity, while noise attributed to the same spectral region, e.g., due to amplified spontaneous emission (ASE), will generally not experience as much attenuation. Similarly, receiver quantization noise will not be attenuated and/or otherwise reduced by attenuation of the notch. Consequently, both situations compound performance degradation resulting in a worsening of the SNR in this spectral region.

Some examples of mitigation strategies that may be employed include application of applying a filter to balance one or more of the interference, e.g., the ISI, and/or the noise. For example, mitigation strategy may include narrow-finesse Weiner filtering as disclosed in U.S. patent application Ser. No. 18/193,322, filed on Mar. 30, 2023, entitled "Method and System for Fine Frequency Finesse Filtering." incorporated herein by reference in its entirety. Alternatively, or in addition, other techniques may be applied to reduce the effects of noise. At least some example noise reduction techniques include brightness filtering, as disclosed in U.S. Pat. No. 11,038,599, incorporated herein by reference in its entirety.

Other example mitigation strategies may be employed to reduce and/or otherwise eliminate the effects of gas absorption line notches on performance of clocks as may be used in the course of coherent optical communications. U.S. Pat. No. 7,627,252, incorporated herein by reference in its entirety, describes using a correlation of an upper edge and/or a lower edge of a spectrum of a stream of symbols for clock recovery. In at least some applications, the width of the spectral edges may be about 0.07 or 0.03 of the symbol rate. A gas absorption line notch can attenuate a significant fraction of a narrow edge of this spectrum, causing increased jitter or even loss of clock. Such degradations of clock recovery may be avoided by applying a mitigation strategy that moves one or more of the afflicted spectral edges away from the gas absorption line notch. At least some embodiments may introduce such movement by digital control of a laser wavelength in the transmitter, and/or by digital control of the symbol rate.

Alternatively, or in addition, a mitigation strategy may impose edgeless clock recovery for scenarios likely to be adversely impacted by gas absorption line notches. Example clock techniques that are much less sensitive to gas-line notches, such as edgeless clock recovery, are disclosed in U.S. Pat. No. 11,126,219, incorporated herein by reference in its entirety. A mitigation method could comprise a digital control switching from using an afflicted clock recovery algorithm to using a more tolerant clock recover algorithm, such as edgeless clock recovery.

Some optical communication signals use pilot tones to enable lower-heat operation of receiver devices. Such systems may experience vulnerabilities when a pilot tone coincides with a gas absorption line notch. Under such circumstances, receiver operation may be degraded and quite possibly precluded. Having identified a presence and/or location of a gas absorption line notch, a mitigation strategy may apply digital control, e.g., to a transmitter, to alter a transmitted spectrum, such that gas absorption line notch location and/or characteristics may be avoided.

It is conceivable that under some circumstances, a residual carrier power in a transmitted optical communication signal may be deliberate and/or at least unavoidable. The residual carrier power may be viewed as spectral tone in the signal spectrum occurring at a transmit frequency of the laser. For example, a single-sideband or an intensity-modulated system might have half of the signal power remain in the carrier. Alternatively, or in addition, imperfections in implementation and/or control of a modulator may create a residual carrier situation. It may be appreciated that a receiver may contain circuits that make use of this residual carrier and/or may contain circuits and algorithms to cancel this residual carrier. In either instance, any alteration, attenuation, and/or modulation of the residual carrier by a gas attenuation line notch may disrupt these receiver methods. A mitigation strategy may generate a digital control that states the presence and location of a gas-line notch, allowing and/or otherwise directing a system to modify one or more receive techniques to avoid degraded performance. Alternatively, or in addition, a mitigation strategy may move the transmit laser frequency in response to the mitigating digital control information. Other mitigation strategies that may be employed alone or in combination with any other mitigation strategy may alter and/or otherwise change a modulation method in response to the digital control.

Under at least some circumstances, a transmit spectrum may include sub-spectra separated by spectral nulls. Advantageously, the detected locations of these spectral nulls may be used during signal acquisition. The presence of one or more gas attenuation line notches in a received signal spectrum may interfere with such processes by appearing as false spectral nulls that may degrade and/or otherwise disable the intended signal acquisition process. Mitigation strategies may apply one or more specialized control methods to counter the possibility of interference from false spectral nulls. For example, the techniques disclosed in U.S. Pat. Nos. 11,239,929; 11,233,568; and/or 10,608,746, all incorporated herein by reference in their entireties, and/or any method that uses spectrally localized control or training information can be degraded by a gas attenuation line notch. For example, some systems may use the notch between FDM channels. After the presence of a gas-line notch is identified, a mitigation strategy may alter and/or otherwise suspend one or more such specialized control methods.

In response to identification of a presence of, and/or determination of significant risk of, a gas absorption line notch, a specifically tolerant equipment design may be identified, e.g., by a product equipment code (PEC), and selected for incorporation, e.g., by a network controller and/or network planning system and/or process. Accordingly, a mitigation strategy may require the use and/or avoidance of certain classes of hardware, configuration, or modulation by the planning system.

FIG. 6B depicts an illustrative embodiment of another GAL mitigation process 620 in accordance with various aspects described herein. According to the example GAL mitigation process 620, a narrow-band absorption is identified at 625, occurring in a frequency spectrum of an optical signal of an optical communication link traversing a gaseous medium. The optical communication link is one of a number of optical communication links of a communication network. According to the example GAL mitigation process 620, the narrow-band absorption is associated at 630 with a vulnerability of the optical communication network. In at least some embodiments, the association may occur responsive to detection of the narrow-band absorption. Further according to the example GAL mitigation process 620, a digital circuit is controlled at 635 to mitigate at least a portion of the vulnerability. In at least some embodiments, mitigation may include a reconfiguration of the communication network. For example, a network configuration may include selection of and/or alteration of an optical network routing path. Alternatively, or in addition, the network configuration may include selection of an optical signal wavelength and/or frequency, e.g., according to a WDM scenario. Alternatively, or in addition, the network configuration may include a clock distribution and/or clock recovery scheme. Alternatively, or in addition, the network configuration may include selection of and/or restriction of an optical communication device, e.g., a coherent optical transmitter, receiver, transceiver and/or modem.

Figure 6C:
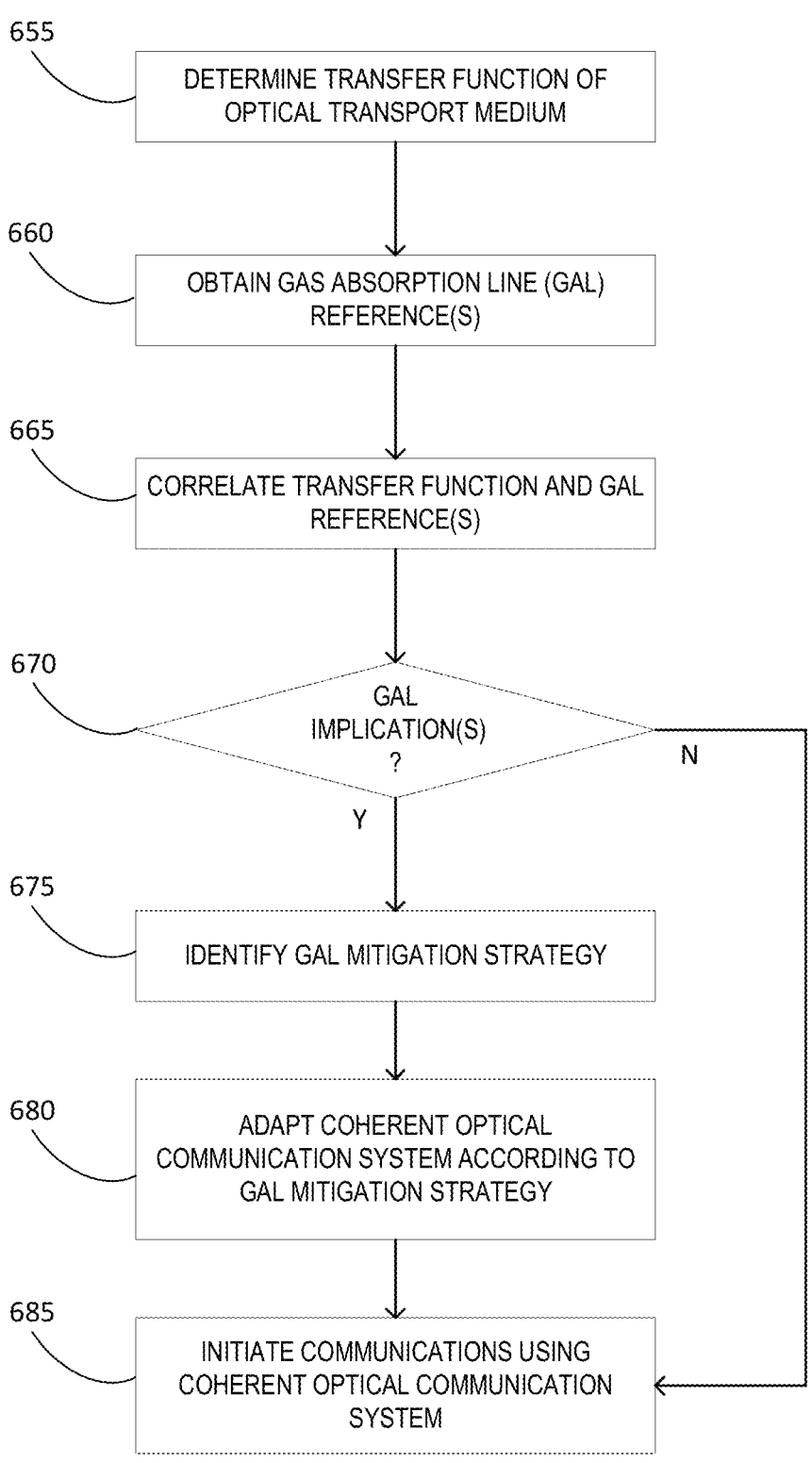

FIG. 6C depicts an illustrative embodiment of another gas absorption line mitigation process 650 in accordance with various aspects described herein. According to the example GAL mitigation process 650, a transfer function of optical transport medium is determined at 655. A record of gas absorption line (GAL) reference(s) may be obtained, generated and/or otherwise accessed at 660. According to the example GAL mitigation process 650, a correlation is determined between the transfer function and the GAL reference(s) at 665.

A potential implication of the GAL to operation of the GAL resistant coherent optical communication system 500 (FIG. 5) is determined at 670. To the extent no potential implications are identified, the example GAL mitigation process 650 may proceed to initiate communications using coherent optical communication system at 685. To the extent that any potential implications are identified, the example GAL mitigation process 650 may proceed to identify a GAL mitigation strategy at 675.

According to the example GAL mitigation process 650, a coherent optical communication system may be adapted and/or otherwise configured according to GAL mitigation strategy at 680. Once suitably configured, the GAL mitigation process 650 may initiate communications using the coherent optical communication system at 685.

While for purposes of simplicity of explanation, the respective processes are shown and described as a series of blocks in FIGS. 6A-6C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the processes and/or methods described herein.

Figure 7:
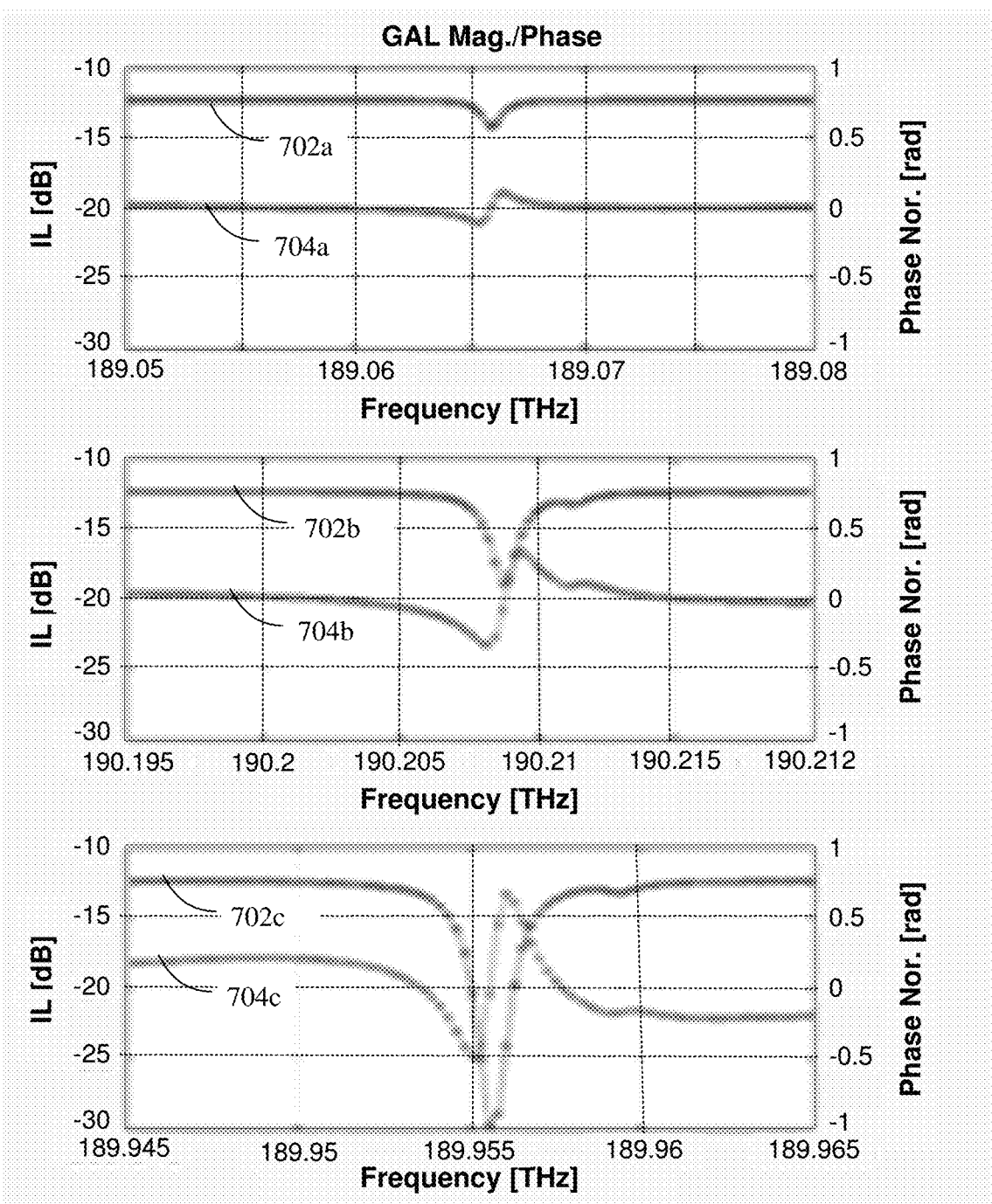
FIG. 7 depicts illustrative graphical examples of gas absorption line characteristics of an optical transport medium in accordance with various aspects described herein.

Phase characteristic of at least some gas absorption line notches may be measured. FIG. 7 depicts illustrative graphical examples of gas absorption line characteristics of an optical transport medium 407, 507 (FIGS. 4 and 5) in accordance with various aspects described herein. Namely, FIG. 7 illustrates measured phase and losses for several measured $CO_2$ lines in the L-band. A first example graph includes a first plot 702a of a first measurement of a first magnitude of a relatively small gas absorption line. The first example graph also illustrates a corresponding first plot 704a of a first measurement of a first phase of the relatively small gas absorption line. A second example graph includes a second plot 702b of a second measurement of a second magnitude of a second medium gas absorption line. The second example graph also illustrates a corresponding second plot 704b of a second measurement of a second phase of the medium gas absorption line. Likewise, a third example graph includes a third plot 702c of a third measurement of a third magnitude of a second medium gas absorption line. The third example graph also illustrates a corresponding third plot 704c of a third measurement of a third phase of the medium gas absorption line.

It is understood that such local phase deviations may severely disrupt a detection of symbols, e.g., by contributing to inter-symbol interference effects. Other implications include control loops that may be degraded and/or disrupted by optical signals that encounter gas absorption lines. Still other implications of gas absorption line notches may degrade the operation of equalization filters. For example, equalization methods of U.S. Pat. No. 8,385,747, incorporated herein by reference in its entirety, utilize a slowly varying "C" filter and a rapidly tracking "H" filter. It is advantageous to extract steady-state impulse responses from the H filter, e.g., periodically, such as second by second, and move them to the C filter. Residual chromatic dispersion is an example of a source of such an impulse response. Any frequency variation of a phase response as may result from a gas absorption line notch, such as the example notches of FIG. 7, may disrupt attempts to estimate and move such impulse responses. Such disruptions may introduce a performance penalty and/or preclude successful detection of the symbols.

Figure 8A:
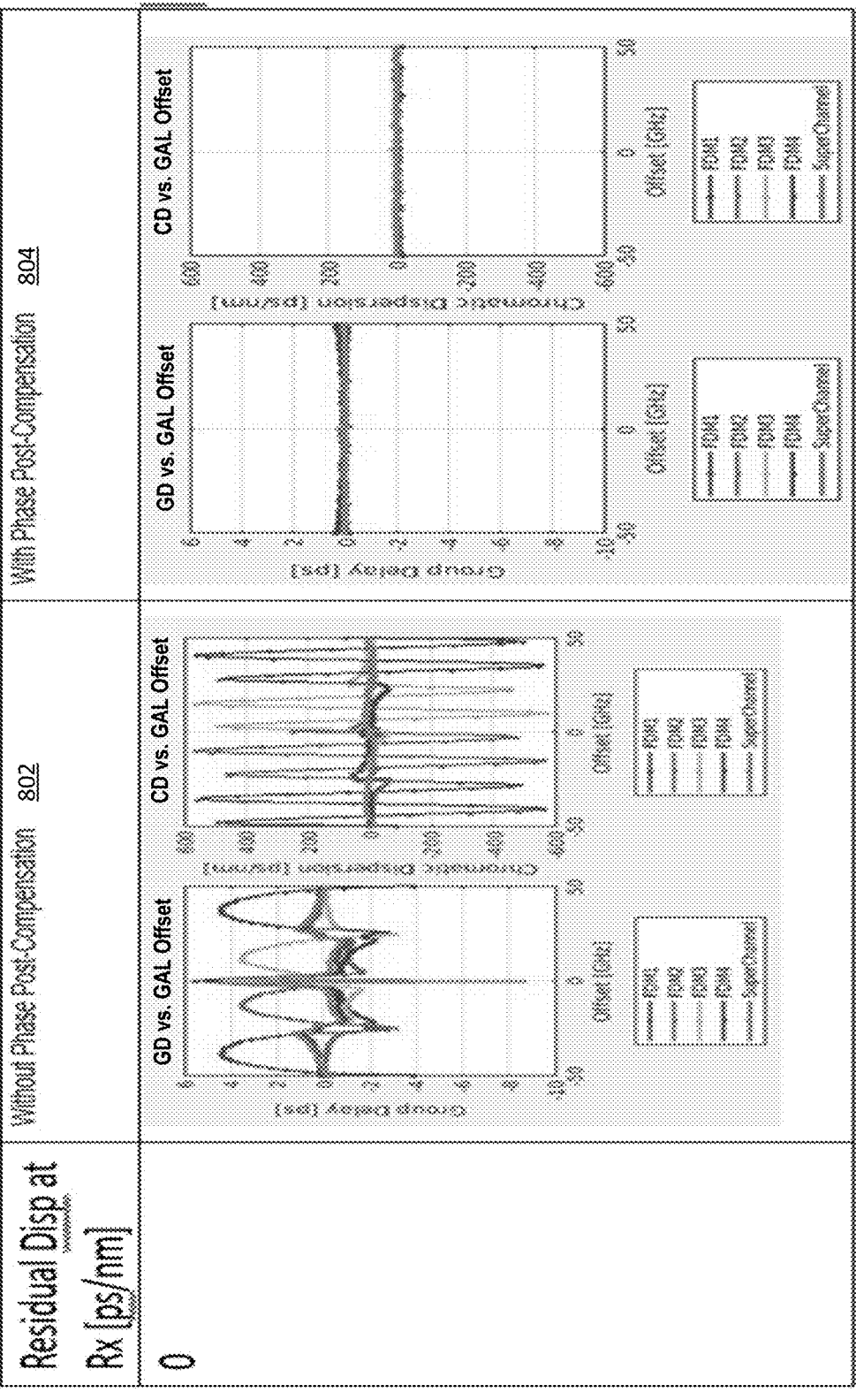
FIGS. 8A and 8B depict illustrative graphical examples of mitigation of gas absorption lines occurring within an optical transport medium in accordance with various aspects described herein.
Figure 8B:
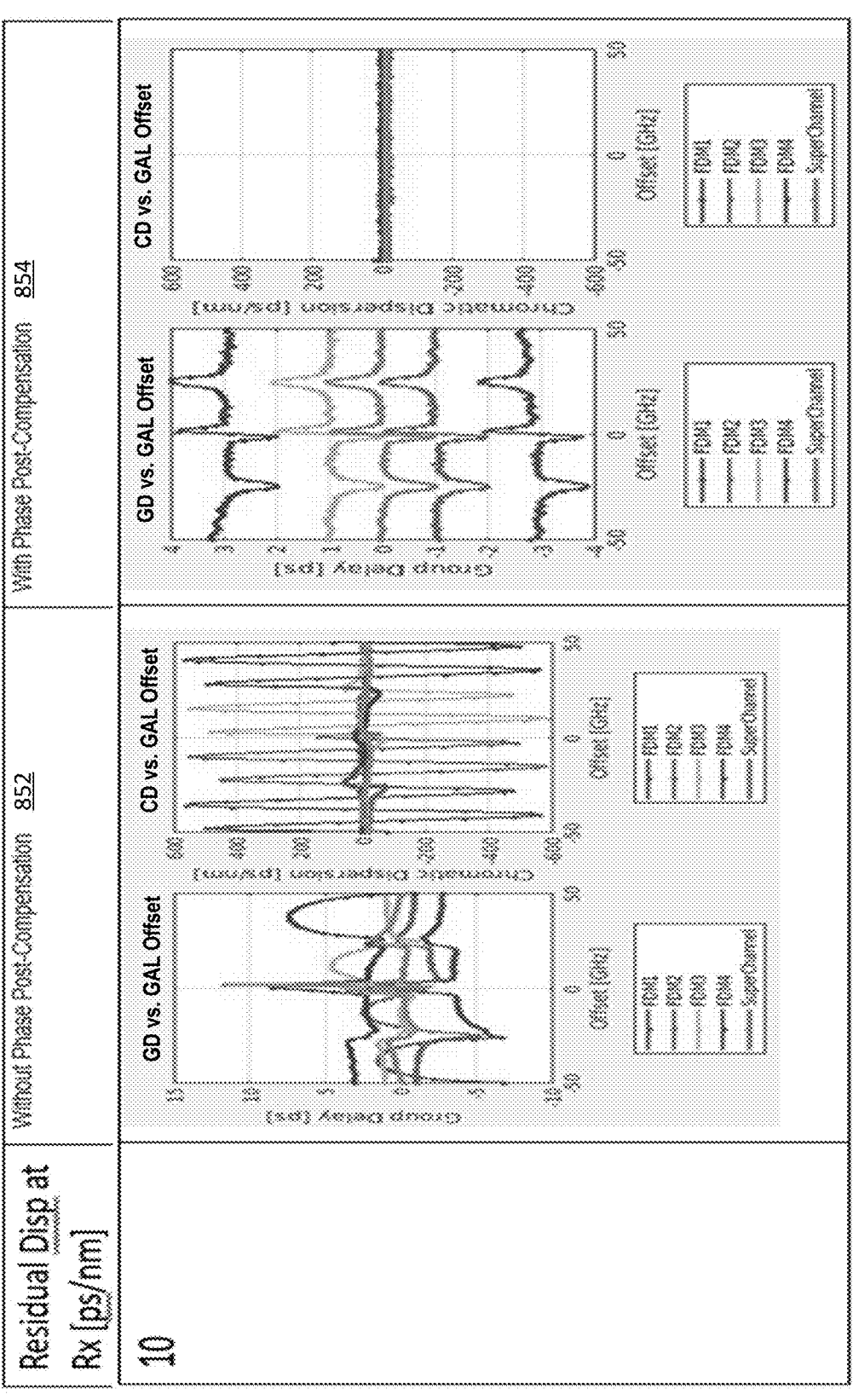

FIGS. 8A and 8B depict graphical of simulation results 800, 850 illustrating examples of gas absorption lines, occurring within an optical transport medium 407, 507 (FIGS. 4 and 5) and mitigation thereof, utilizing one or more of the various detection and/or mitigation techniques, in accordance with various aspects described herein. A first simulation result 800 demonstrates an estimated group delay (GD) and chromatic dispersion (CD) extracted from LMS taps of a digital filter as a function of a center frequency of a gas absorption line notch within a baseband spectrum. The example simulations were determined according to a pluggable optical device, model WL5e, available from CIENA Corporation of Hanover, MD.

A first simulation result 800 simulates performance at 0 GD and 0 ps/nm CD of post-phase compensation. The un-compensated performance 802 is provided in a left-hand column, illustrating that narrow phase spectra of the gas absorption line notch causes errors in the extracted residual CD and GD. These errors can be substantially reduced as illustrated in a compensated performance 804 provided in a right-hand column, when the extractions of GD and CD are preceded by a compensation of the narrow phase spectrum. A second simulation result 850 simulates performance at 10 ps/nm CD of post-phase compensation. The un-compensated performance 852 is provided in a left-hand column, illustrating that narrow phase spectra of the gas absorption line notch causes errors in the extracted residual CD and GD. Once again, these errors may be substantially reduced as illustrated in a compensated performance 854 provided in a right-hand column, when the extractions of GD and CD are preceded by a compensation of the narrow phase spectrum.

Figure 9:
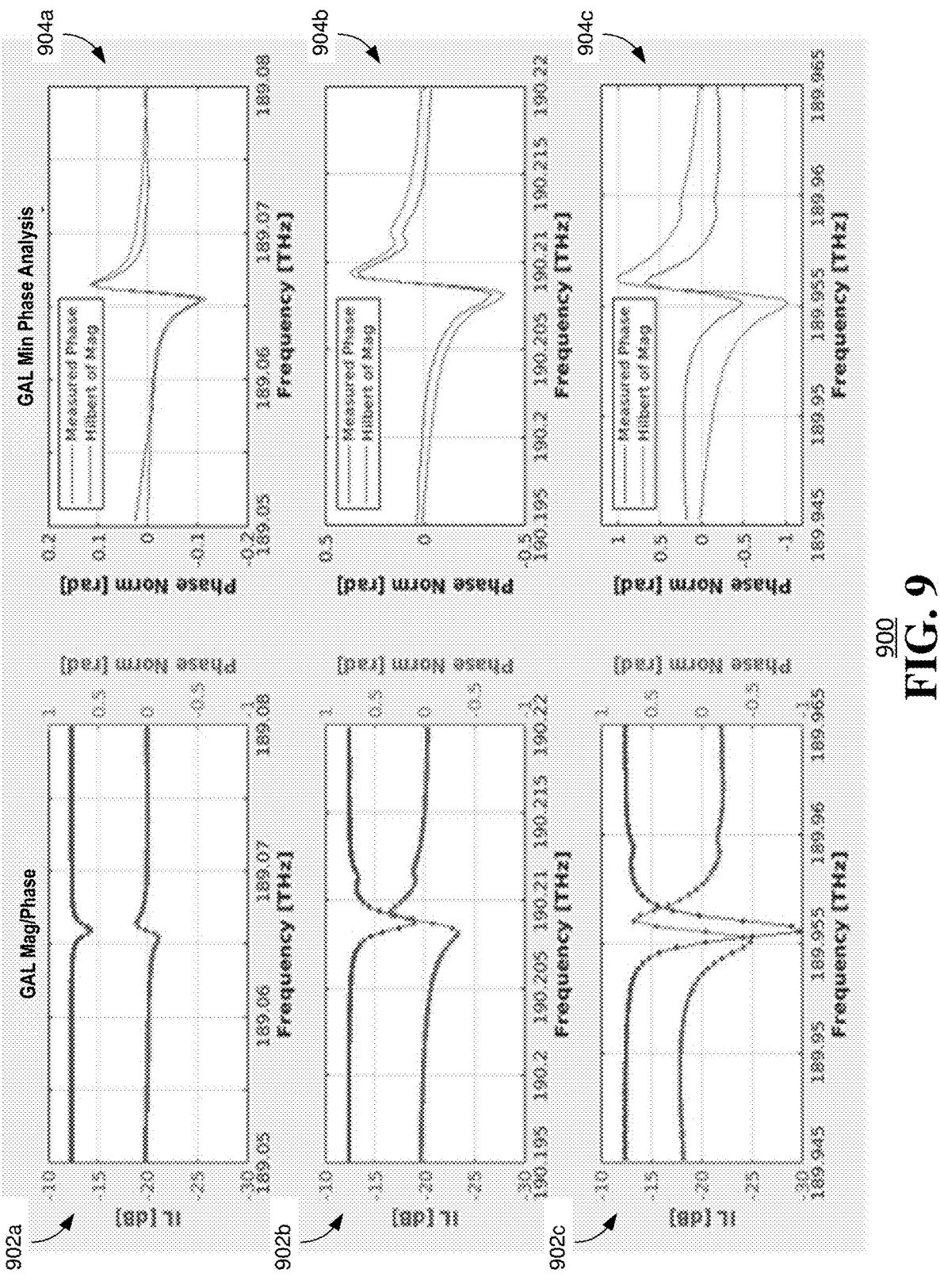
FIG. 9 depicts illustrative graphical examples of gas absorption line characteristics of an optical transport medium in accordance with various aspects described herein.

In at least some embodiments, a phase response of a gas absorption line notch may be estimated from an attenuation spectrum. For example, such estimates may be obtained by taking a Hilbert transform of a log of a square root of the gas attenuation line amplitude as a function of frequency. FIG. 9 depicts illustrative graphical examples of gas absorption line characteristics of an optical transport medium 407, 507 (FIGS. 4 and 5) in accordance with various aspects described herein. A first example measurement graph 902*a* includes a first plot 902*a* of first measurements of a first magnitude and phase of a relatively small gas absorption line notch. A second example measurement graph 902*b* includes a second plot of second measurements of a second magnitude and phase of a medium gas absorption line notch. Similarly, a third example measurement graph 902*c* includes a third plot of third measurements of a third magnitude and phase of a large gas absorption line notch.

A first example comparison graph 904*a* illustrates a comparison of a measured phase and calculated phase of the relatively small gas absorption line notch of FIG. 902*a*. A second example comparison graph 904*b* illustrates a comparison of a measured phase and calculated phase of the medium gas absorption line notch of FIG. 902*b*. Similarly, a third example comparison graph 904*c* illustrates a comparison of a measured phase and calculated phase of the medium gas absorption line notch of FIG. 902*c*. According to the graphical comparisons, the measured phase predominantly follows the theoretically anticipated minimum phase, more so for shallower notches.

In at least some embodiments, a phase response of the gas absorption line notch may be measured directly. Alternatively, or in addition, the phase response of the gas absorption line notch may be obtained from a predetermined, e.g., tabulated phase response characteristics. It is understood further that in at least some embodiments, a mitigation strategy, e.g., including a digital control, may be identified to mitigate adverse effects of a gas absorption line notch phase, responsive to identification of, location of, characterization of, and/or estimation of a gas absorption line notch.

Mitigation strategies may include, without limitation, suspension and/or modification of impulse response transfer algorithms. Alternatively, or in addition, a digital filter, such as an equalization filter, e.g., a C filter, an H filter and/or an X, filter may be modified and/or otherwise adapted to compensate for a measurement and/or an estimate of a phase transfer function of a gas absorption line notch.

Figures 10A, 10B:
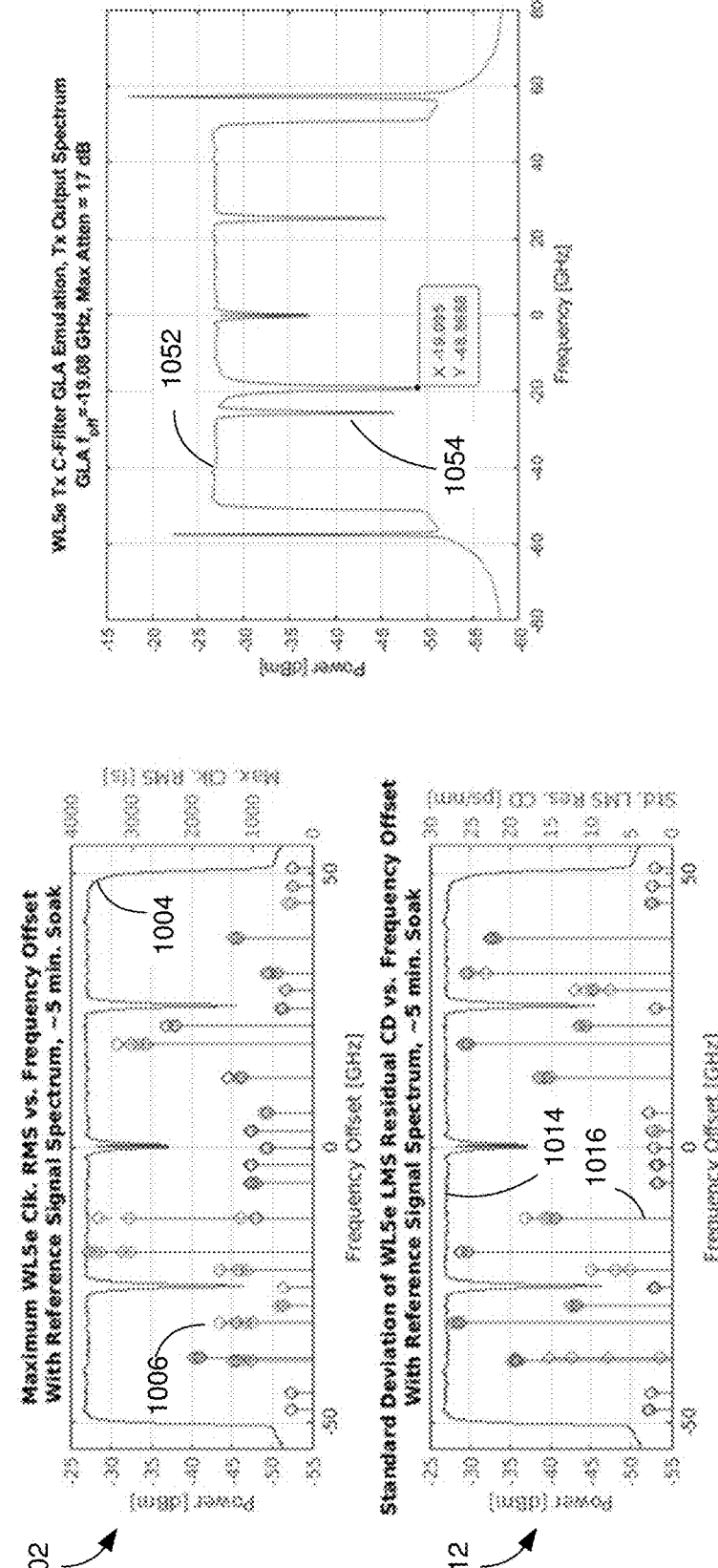
FIGS. 10A and 10B depict illustrative graphical examples of adverse implications of gas absorption line occurring within an optical transport medium in accordance with various aspects described herein.

FIGS. 10A and 10B depict illustrative graphical examples of adverse implications of gas absorption line occurring within an optical transport medium 407, 507 (FIGS. 4 and 5) in accordance with various aspects described herein. Namely, the graphical examples illustrate experimental evidence of vulnerability to and mitigation of a presence of gas absorption line notches. FIG. 10A illustrates measurements 1000 of a reference signal spectrum 1004 and maximum instances 1002 and standard deviation 1012 of receive clock RMS (fs) 1006 and LMS residual CD 1012 at a set of gas absorption line notch locations placed within a transmission spectrum of an example model WL5e, coherent pluggable optics device. According to the illustrative example, a gas absorption line notch was measured in an L-band. Phase and amplitude transfer functions of the gas absorption line notch were installed into a Tx C-filter. FIG. 10B illustrates a spectrum of a received signal 1050 with the gas absorption line notch 1054 installed near −48.9 GHZ, a frequency with relatively high clock RMS. According to the experiment, the transceiver lost continuity when the notch was inserted at this frequency.

Figure 11:
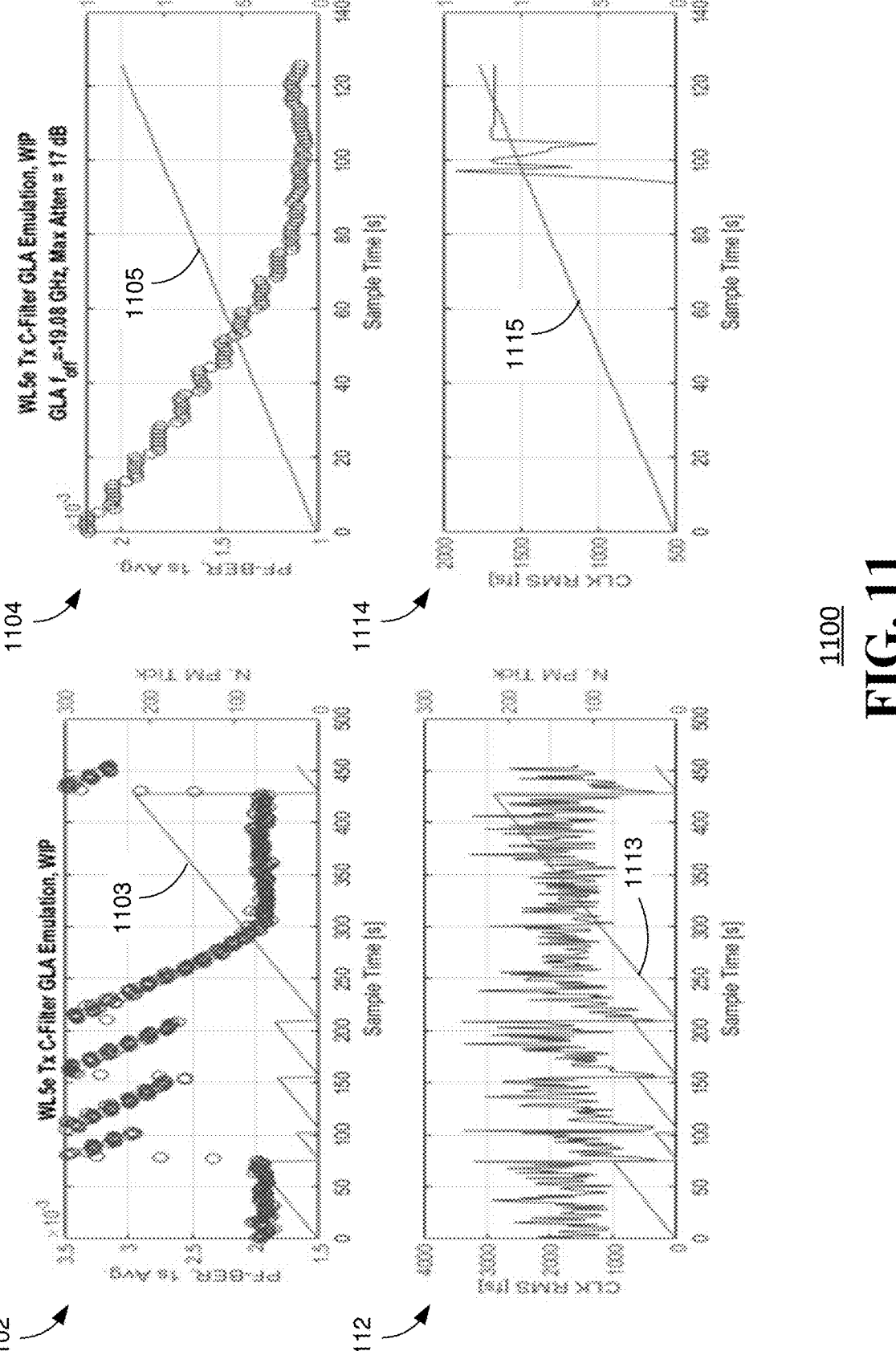
FIG. 11 depicts illustrative additional graphical examples of adverse implications of gas absorption line occurring within an optical transport medium in accordance with various aspects described herein.

Details of a loss of continuity are illustrated in FIG. 11 depicting illustrative additional graphical examples of adverse implications of gas absorption line occurring within an optical transport medium 407, 507 (FIGS. 4 and 5) in accordance with various aspects described herein. A left-hand portion of FIG. 11 shows bit error rate (BER) 1102, clock root-mean-square (RMS) 1112 and PM ticks 1103, 1113 vs. time with the gas absorption line notch at about −48.9 MHZ. Resets in the PM tick count 1103, 1113 occur at reacquisitions. A right-hand portion of FIG. 11 shows bit error rate (BER) 1104, clock root-mean-square (RMS) 1114 and PM ticks 1105, 1115 vs. time with the gas absorption line notch at about −48.9 MHZ. The right-hand graphs 1104, 1114 illustrate an example of stable continuity when common mode feedback from the fast LMS to the slow C-Filter is disconnected. The example results illustrate that an estimate of common mode content in the LMS filter is unreliable.

Figure 12:
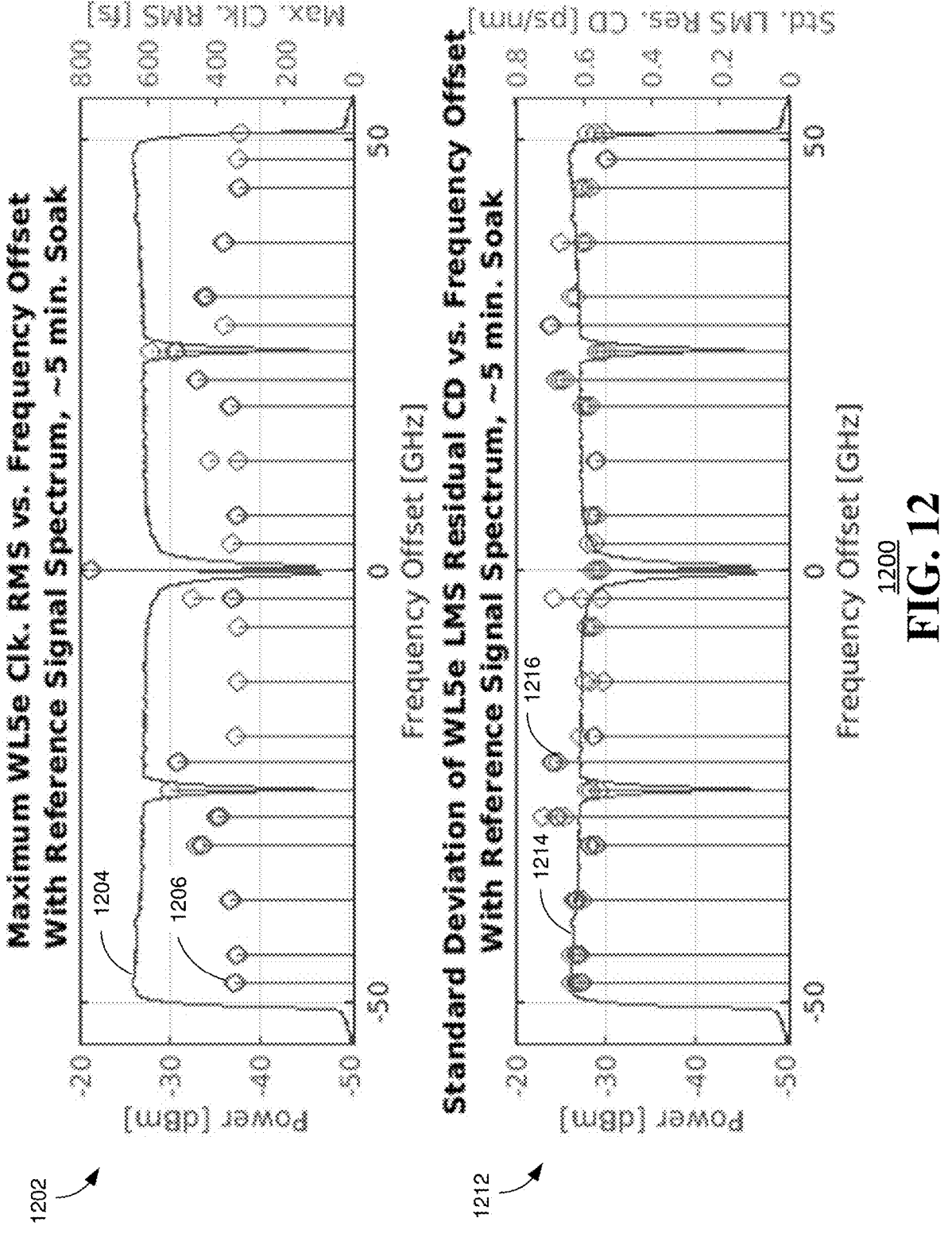
FIG. 12 depicts illustrative graphical examples of performance of a coherent optical communication system configured to mitigate gas absorption line occurring within an optical transport medium in accordance with various aspects described herein.

FIG. 12 depicts illustrative graphical examples of performance 1200 of a coherent optical communication system configured to mitigate gas absorption line notch occurring within an optical transport medium in accordance with various aspects described herein. A first graph 1202 illustrates a power spectrum of an optical signal received by a muxponder optical transponder, e.g., the second coherent optical model 504 (FIG. 5). The first graph 1202 shows a clock RMS 1206 versus frequency location of a gas absorption line notch superimposed over an example optical signal spectrum 1204. A second graph 1212 illustrates CD estimates 1216 versus frequency location of a gas absorption line notch over an example optical signal spectrum 1214. The first and second graphs 1202, 1204 illustrate performance when a common mode LMS to C-filter feedback is asserted and a phase response of the gas line notch is corrected, e.g., in a receiver Rx C-filter. These tests resulted in stable continuity and can be compared to the results presented in FIG. 10A for a measure of improvement. Note that according to such a comparison, the clock RMS has dropped by a factor of about 10 versus the uncorrected case in FIGS. 10A, 10B and 11. This test shows that correcting for the phase response of the gas line redeems the common mode LMS to C-filter feedback loop.

One or more aspects of the subject disclosure include a process, comprising obtaining a signal received at a coherent optical receiver, and equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter.

One or more aspects of the subject disclosure include a device, comprising a processing system including a processor, and a memory that stores executable instructions that, when executed by the processing system, facilitate performance of operations. The operations may include obtaining a signal received at a coherent optical receiver, and equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter.

One or more aspects of the subject disclosure include a non-transitory machine-readable medium, comprising executable instructions that, when executed by a processing system including a processor, facilitate performance of operations. The operations may include obtaining a signal received at a coherent optical receiver, and equalizing the signal using a filter system, wherein the filter system includes a first filter that provides a first filtering characteristic, a second filter that provides a second filtering characteristic, and a third filter that provides a third filtering characteristic, wherein an adjustment rate of the first filter and an adjustment rate of the second filter are each at least ten times an adjustment rate of the third filter, and wherein the adjustment rate of the first filter is at least ten times the adjustment rate of the second filter.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems, processes and/or methods herein are intended to comprise, without being limited to comprising, these and any other suitable types of memory.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a process and/or a method, an apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a detector configured to identify a narrow-band absorption occurring within a signal spectrum of an optical signal propagating through a gaseous medium, wherein the optical signal is configured to communicate digital information via an optical communication link comprising a transmitter, a receiver and an optical transport medium therebetween; and
   a mitigation controller configured to control a digital circuit to mitigate at least a portion of a vulnerability of the optical communication link, the vulnerability associated with the narrow-band absorption, wherein the detector is further configured to correlate a spectral occupancy of at least a portion of the signal spectrum with a predetermined spectrum of a gas absorption line to obtain a correlation result, wherein the identifying the narrow-band absorption is based on the correlation result.

2. The device of claim 1, wherein the gaseous medium occupies a void within a hollow core optical fiber.

3. The device of claim 1, wherein the gaseous medium occupies an unconstrained space of the optical transport medium, wherein the detector is further configured to compare a spectral occupancy of at least a portion of the signal spectrum with a gas absorption spectrum to obtain a comparison result, and wherein the mitigation controller is further configured to control the digital circuit responsive to the comparison result indicating the narrow-band absorption coincides with a gas absorption line of the gas absorption spectrum.

4. The device of claim 1, wherein the vulnerability associated with the narrow-band absorption is responsive to the correlation result indicating the narrow-band absorption coincides with the spectrum of the gas absorption line.

5. The device of claim 1, wherein the receiver comprises the digital circuit, and wherein the mitigation controller is further configured to adjust operation of the receiver responsive to the narrow-band absorption.

6. The device of claim 1, wherein the detector is further configured to detect an attenuation feature of the signal spectrum, wherein the identifying the narrow-band absorption is based on the attenuation feature.

7. The device of claim 1, wherein the optical communication link further comprises a chromatic dispersion compensation algorithm, and wherein the mitigation controller is further configured to modify a behavior of the chromatic dispersion compensation algorithm.

8. The device of claim 1, wherein the optical communication link comprises a coordinated timing scheme, wherein the vulnerability is related to the coordinated timing scheme, and wherein control of the digital circuit adjusts the coordinated timing scheme.

9. The device of claim 1, wherein the control of the digital circuit further comprises adaptation of a filter.

10. The device of claim 9, wherein the adaptation of the filter further comprises adaptation of at least one of a phase response and an amplitude response of the filter.

11. The device of claim 1, wherein the mitigation controller is further configured to estimate a minimum-phase from a spectral amplitude of the narrow-band absorption.

12. The device of claim 1, wherein the mitigation controller is further configured to fit at least one of an amplitude and a phase to a region of the signal spectrum comprising the narrow-band absorption.

13. The device of claim 1, wherein the vulnerability further comprises a control instability of at least a portion of the optical communication link, and wherein the mitigation controller is further configured to control the digital circuit to mitigate at least a portion of the control instability.

14. The device of claim 1, wherein the vulnerability further comprises a signal distortion, and wherein the mitigation controller is further configured to control the digital circuit to mitigate at least a portion of the signal distortion.

15. The device of claim 1, wherein the mitigation controller is further configured to control the digital circuit to alter a sub-region of the signal spectrum, and wherein the mitigation of the at least a portion of the vulnerability is based at least in part on alteration of the sub-region of the signal spectrum.

16. A network controller, comprising:

a detector interface configured to receive detection of a narrow-band absorption occurring within a frequency spectrum of an optical signal propagating through a gaseous medium, wherein the optical signal is configured to communicate digital information via an optical communication link of a plurality of optical communication links of a communication network, the optical communication link comprising a transmitter, a receiver and an optical transport medium therebetween; and a mitigation controller configured to control a digital circuit to mitigate at least a portion of a vulnerability of the optical communication link, the vulnerability associated with the detection of the narrow-band absorption, wherein the detection of the narrow-band absorption is based on a correlation of a spectral occupancy of at least a portion of the frequency spectrum of the optical signal with a predetermined spectrum of a gas absorption line to obtain a correlation result, wherein the detection of the narrow-band absorption is based on the correlation result.

17. The network controller of claim 16, wherein the digital circuit comprises a network configuration function, and wherein the mitigation of the at least a portion of the vulnerability comprises adjusting a configuration of the communication network via the network configuration function.

18. The network controller of claim 17, wherein the network configuration function determines the frequency spectrum of the optical signal according to a channel selection from among a plurality of channels, the channel selection mitigating the at least a portion of the vulnerability.

19. A non-transitory, machine-readable medium, comprising executable instructions that, when executed by a processing system including a processor, facilitate performance of operations, the operations comprising:

correlating a spectral occupancy of at least a portion of a signal spectrum with a predetermined spectrum of a gas absorption line to obtain a correlation result;

identifying a narrow-band absorption occurring within a frequency spectrum of an optical signal propagating through a gaseous medium, wherein the identifying the narrow-band absorption is based on the correlation result and wherein the optical signal is configured to communicate digital information via an optical communication link comprising a transmitter, a receiver and an optical transport medium therebetween; and controlling a digital circuit to mitigate at least a portion of a vulnerability of the optical communication link, the vulnerability associated with the narrow-band absorption.

20. The non-transitory, machine-readable medium of claim 19, further comprising:

detecting one of an attenuation feature, a phase feature, or both, of a channel spectrum of the optical communication link, wherein the controlling of the digital circuit further comprises adapting one of an amplitude response, a phase response, or both, of an optical channel compensation filter.

* * * * *